United States Patent
Yamamoto et al.

(10) Patent No.: US 12,236,781 B2
(45) Date of Patent: Feb. 25, 2025

(54) POSITION ESTIMATION METHOD AND POSITION ESTIMATION SYSTEM

(71) Applicant: Aichi Steel Corporation, Tokai (JP)

(72) Inventors: Michiharu Yamamoto, Tokai (JP); Hitoshi Aoyama, Tokai (JP)

(73) Assignee: AICHI STEEL CORPORATION, Tokai (JP)

(*) Notice: Subject to any disclaimer, the term of this patent is extended or adjusted under 35 U.S.C. 154(b) by 512 days.

(21) Appl. No.: 17/777,642

(22) PCT Filed: Nov. 20, 2020

(86) PCT No.: PCT/JP2020/043476
§ 371 (c)(1),
(2) Date: May 18, 2022

(87) PCT Pub. No.: WO2021/100865
PCT Pub. Date: May 27, 2021

(65) Prior Publication Data
US 2023/0003530 A1  Jan. 5, 2023

(30) Foreign Application Priority Data
Nov. 22, 2019  (JP) ................. 2019-211864

(51) Int. Cl.
*G08G 1/042* (2006.01)
*G01C 21/28* (2006.01)

(52) U.S. Cl.
CPC ............. *G08G 1/042* (2013.01); *G01C 21/28* (2013.01)

(58) Field of Classification Search
CPC ........ G01C 21/28; G01C 21/08; G08G 1/042; G01V 3/165; G05D 1/0261; G05D 1/0274
See application file for complete search history.

(56) References Cited

U.S. PATENT DOCUMENTS

| | | | | |
|---|---|---|---|---|
| 6,019,184 A | * | 2/2000 | Nagai | G05D 1/0261 701/49 |
| 2011/0193723 A1 | * | 8/2011 | Qin | E01F 11/00 340/941 |

(Continued)

FOREIGN PATENT DOCUMENTS

| CN | 108592903 A | 9/2018 |
|---|---|---|
| EP | 3467437 A1 | 4/2019 |

(Continued)

OTHER PUBLICATIONS

Extended European search report issued on Nov. 9, 2023, in corresponding European patent Application No. 20889060.8, 12 pages.

(Continued)

*Primary Examiner* — Donald J Wallace
(74) *Attorney, Agent, or Firm* — XSENSUS LLP

(57) ABSTRACT

A position estimation system for a vehicle including a magnetic sensor which measures magnetism acting from a road surface side forming a surface of a traveling road to estimate an own vehicle position includes a map DB which stores a map (1) associated with a road-surface magnetic distribution (M2), which is a distribution of quantities of magnetism at respective points on the road surface, a magnetic distribution generation part which acquires magnetic measurement values from the magnetic sensor and generates a measured magnetic distribution, which is a distribution of magnetic measurement values, and a position estimation part which specifies an area corresponding to the measured magnetic distribution in the road-surface magnetic distribution (M2) associated with the map stored in the map DB and estimates the own vehicle position based on a position of the area corresponding to the measured magnetic distribution on the map.

20 Claims, 21 Drawing Sheets

(56) References Cited

U.S. PATENT DOCUMENTS

| | | | |
|---|---|---|---|
| 2012/0035844 A1* | 2/2012 | Ono | B60W 30/12 427/550 |
| 2013/0332018 A1 | 12/2013 | Kim | |
| 2019/0196496 A1 | 6/2019 | Yamamoto et al. | |
| 2020/0012294 A1 | 1/2020 | Yamamoto et al. | |
| 2020/0133299 A1 | 4/2020 | Yamamoto et al. | |
| 2020/0320870 A1 | 10/2020 | Yamamoto et al. | |
| 2020/0379062 A1* | 12/2020 | Ho | G01C 21/08 |
| 2021/0101497 A1* | 4/2021 | Schmitt | G05D 1/0225 |
| 2021/0165419 A1 | 6/2021 | Yamamoto et al. | |

FOREIGN PATENT DOCUMENTS

| | | |
|---|---|---|
| JP | 2011-129049 A | 6/2011 |
| JP | 2013-186718 A | 9/2013 |
| JP | 2014-34251 A | 2/2014 |
| JP | 2018-36797 A | 3/2018 |
| JP | 2018-165855 A | 10/2018 |
| JP | 2019-184474 A | 10/2019 |
| JP | 2020098566 A * | 6/2020 |
| KR | 2015-0125115 A | 11/2015 |
| WO | 2018/056391 A1 | 3/2018 |
| WO | WO-2018043273 A1 * | 3/2018 ............ B60W 30/12 |

OTHER PUBLICATIONS

Dongyan Wei et al., "Vehicle Localization Based on Odometry Assisted Magnetic Matching", 2017 International Conference on Indoor Positioning and Indoor Navigation (IPIN), IEEE, Sep. 18-21, 2017, total 6 pages.

International Search Report and Written Opinion mailed on Jan. 19, 2021, received for PCT Application PCT/JP2020/043476, Filed on Nov. 20, 2020, 8 pages including English Translation.

* cited by examiner

POSITION ESTIMATION METHOD AND POSITION ESTIMATION SYSTEM

CROSS-REFERENCE TO RELATED APPLICATIONS

The present application is based on PCT filing PCT/JP2020/043476, filed Nov. 20, 2020, which claims priority to JP 2019-211864, filed Nov. 22, 2019, the entire contents of each are incorporated herein by reference.

TECHNICAL FIELD

The present invention relates to a position estimation method and a position estimation system for estimating the position of an own vehicle on a map.

BACKGROUND ART

In recent years, various techniques have been suggested for assisting vehicle driving such as lane following traveling and automatic driving (for example, refer to Patent Literature 1), and technology developments toward achievement have been active. To achieve sophisticated driving assists such as automatic driving, three-dimensional maps with high accuracy representing traveling environments have been suggested and utilized.

For example, in Patent Literature 2 below, a highly-accurate three-dimensional map including three-dimensional position information such as lane marks and curbstones is described. This highly-accurate three-dimensional map is effective to grasp the three-dimensional structure of the traveling environment with high accuracy. Grasping the three-dimensional structure of the traveling environment with high accuracy is imperative to achieve lane following traveling, automatic driving, and so forth.

CITATION LIST

Patent Literatures

Patent Literature 1: Japanese Unexamined Patent Application Publication No. 2014-34251
Patent Literature 2: Japanese Unexamined Patent Application Publication No. 2013-186718

SUMMARY OF INVENTION

Technical Problem

Even if a highly-accurate three-dimensional map is usable, when the accuracy of position estimation of an own vehicle on that three-dimensional map is insufficient, there is a possibility that the high accuracy of the three-dimensional map cannot be sufficiently utilized and highly-accurate driving assist cannot be achieved.

The present invention was made in view of the above-described conventional problem, and is to provide a method and system for estimating the position of an own vehicle on a map.

Solution to Problem

One mode of the present invention resides in a position estimation method for a vehicle including a magnetic sensor which measures magnetism acting from a road surface forming a surface of a traveling road to estimate an own vehicle position, including:
a magnetic measurement process of acquiring magnetic measurement values from the magnetic sensor;
a magnetic distribution generation process of generating a measured magnetic distribution indicating a distribution of magnetic data based on the magnetic measurement values acquired from the magnetic measurement process; and
a position estimation process of, by referring to a map associated with a road-surface magnetic distribution indicating a distribution of magnetic data based on quantities of magnetism at respective points on the road surface, specifying an area of the road-surface magnetic distribution corresponding to the measured magnetic distribution and estimating the own vehicle position based on a position of the area corresponding to the measured magnetic distribution on the map.

One mode of the present invention resides in a position estimation system for estimating an own vehicle position of a vehicle including a magnetic sensor which measures magnetism acting from a road surface forming a surface of a traveling road, including:
a storage part which stores a map associated with a road-surface magnetic distribution, which is a distribution of magnetic data based on quantities of magnetism at respective points on the road surface;
a magnetic distribution generation part which acquires a magnetic measurement value from the magnetic sensor and generates a measured magnetic distribution, which is a distribution of magnetic data based on the magnetic measurement value; and
a position estimation part which specifies an area corresponding to the measured magnetic distribution in the road-surface magnetic distribution associated with the map stored in the storage part and estimates the own vehicle position based on a position of the area corresponding to the measured magnetic distribution on the map.

Advantageous Effects of Invention

The present invention is an invention for estimating the own vehicle position in a map. The map associated with the road-surface magnetic distribution allows collation with the measured magnetic distribution acquired on a vehicle side. If an area of the road-surface magnetic distribution corresponding to the measured magnetic distribution can be specified, the own vehicle position can be estimated based on the position of that area corresponding to the measured magnetic distribution on the map.

DESCRIPTION OF EMBODIMENTS

In the present invention, as magnetic data configuring a road-surface magnetic distribution and a measured magnetic distribution, in addition to quantities of magnetism or magnetic measurement values themselves, magnetic gradients are suitable. A magnetic gradient can be calculated from, for example, a difference between quantities of magnetism or magnetic measurement values at two locations on the road surface. For example, when magnetism on the road surface is measured by using a sensor array having magnetic sensors arrayed therein, a magnetic gradient can be calculated from, for example, a difference between magnetic measurement values from adjacent magnetic sensors. Also, for example, a temporal magnetic gradient may be calculated from a difference between magnetic measurement values at different times from one magnetic sensor. Furthermore, it can be thought that, for example, this difference forming a temporal magnetic gradient is calculated for each of two magnetic sensors and a difference is further taken between these two magnetic sensors, thereby calculating a magnetic gradient.

In the magnetic gradient, a magnetic component acting uniformly or almost uniformly on the magnetic sensor is suppressed. For this reason, in the magnetic gradient, a magnetic component acting from a magnetism generation source that is present relatively far away is suppressed, and a magnetic component acting from a magnetism generation source that is present relatively near, such as one on the road surface or the like, is relatively emphasized. Therefore, by adopting the magnetic gradient as magnetic data configuring a road-surface magnetic distribution and a measured magnetic distribution, influences by magnetism generation sources such as surrounding vehicles, guardrails, and billboards and influences by terrestrial magnetism can be suppressed, and the distribution becomes in a state in which magnetism on the road surface is reflected with high accuracy.

Embodiments of the present invention are specifically described by using the following embodiments.

First Embodiment

The present embodiment is an example regarding a position estimation method and position estimation system 1S for estimating the position of an own vehicle on a map with high accuracy. Details of this are described by using FIG. 1 to FIG. 12.

Figure 1:
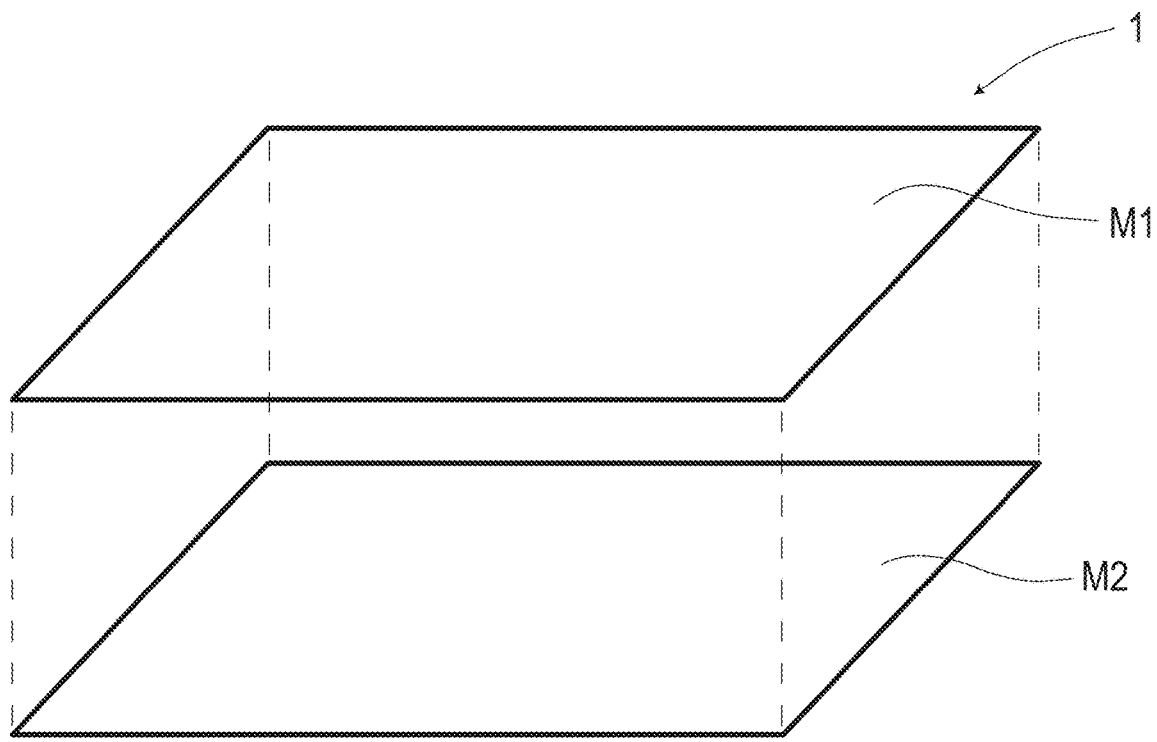
FIG. 1 is a diagram describing the configuration of a map in a first embodiment.
Figure 2:
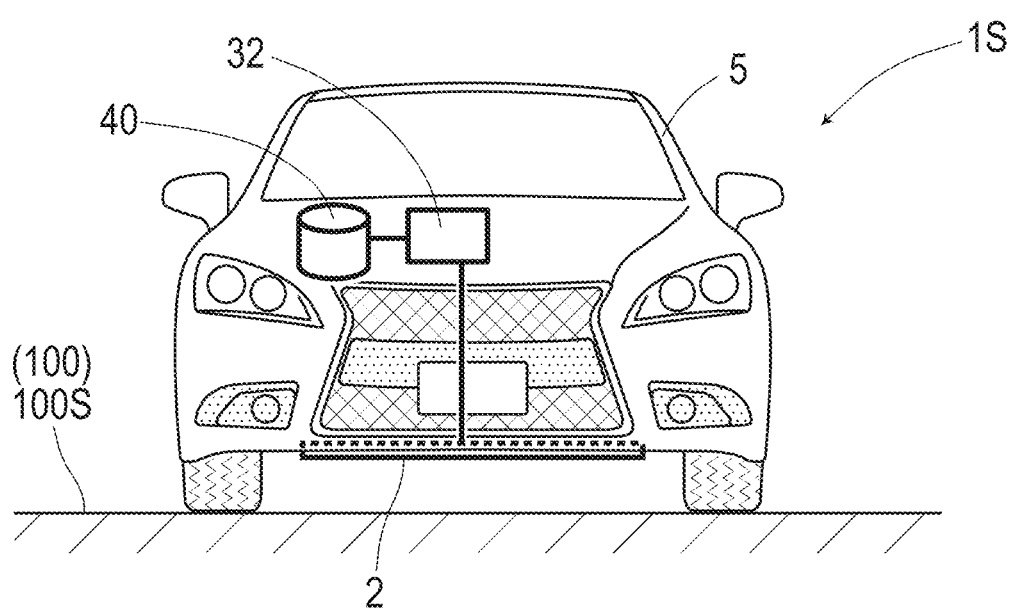
FIG. 2 is a front view of a vehicle in the first embodiment.

Position estimation system 1S is a system which estimates a position of an own vehicle (own vehicle position) by using a distribution of magnetic data (magnetic distribution) based on quantities of magnetism at respective points on road surface 100S (FIG. 2). Road surface 100S forming a surface of road (one example of a traveling road) 100 is formed of a pavement material. The pavement material is inevitably mixed with a magnetic material such as metal powder. A manhole exposed to road surface 100S, a joint (expansion device) of a bridge, and so forth are often made of metal, and can be magnetism generation sources. For this reason, the magnitude of magnetism at each point on road surface 100S is not constant but is varied.

The magnetic distribution on road surface 100S is similar in mode of distribution to variations in brightness at respective points on an image acquired by, for example, taking an image of road surface 100S from straight above by an imaging camera, that is, luminance distribution. Although the magnetic distribution on road surface 100S is different from the luminance distribution in physical quantity as a target, as with the case in which the luminance distribution indicates a luminance pattern on road surface 100S, the magnetic distribution indicates a magnetic pattern on road surface 100S. Position estimation system 1S of the present embodiment estimates an own vehicle position by using a road-surface magnetic distribution, which is a distribution of magnetic data based on quantities of magnetism at the respective points on road surface 100S. Note that the quantity of magnetism itself is adopted as magnetic data in the present embodiment. Therefore, the road-surface magnetic distribution of the present embodiment is a distribution of magnetic data being quantities of magnetism at the respective points on road surface 100S.

On map 1 (FIG. 1) to be used by position estimation system 1S, road-surface magnetic distribution M2 is associated with structure map M1 where a road structure and so forth are depicted. Structure map M1 and road-surface magnetic distribution M2 are associated with each other by position data indicating absolute positions. A position in road-surface magnetic distribution M2 uniquely corresponds to a position on structure map M1. If an area of a distribution pattern identical to that of the magnetic distribution on road surface 100S measured by a vehicle can be specified in road-surface magnetic distribution M2, the own vehicle position on map 1 can be estimated based on the position of that area.

This position estimation system 1S can be combined with, for example, an automatic driving system (omitted in the drawings) for achieving automatic driving of a vehicle. For example, the automatic driving system grasps the structure of a traveling environment ahead by using the own vehicle position estimated by position estimation system 1S. For example, by adopting a three-dimensional map, it is possible to grasp a three-dimensional structure of the traveling environment ahead and achieve automatic traveling with high accuracy.

Road-surface magnetic distribution M2 indicates a distribution of magnetic data being quantities of magnetism at the respective points on road surface 100S can be generated by using, for example, a measuring vehicle (omitted in the drawings) including a positioning system with high accuracy including an RTK-GPS unit, IMU, and so forth and a magnetic measurement unit having magnetic sensors arrayed in a vehicle-width direction. The RTK-GPS (Real-Time Kinematic Global Positioning System) is a known system which enhances positioning accuracy in units of centimeters by using a reference station. The IMU (Inertial Measurement Unit) is a known unit which estimates a relative position of a vehicle by inertial navigation. The IMU includes an electronic compass which measures an azimuth, acceleration sensor, gyro sensor, and so forth to calculate a relative position with respect to a position as a reference. By using the relative position estimated by the IMU, highly-accurate positioning can be achieved even between buildings, in a tunnel, and so forth where GPS waves are unstable.

The magnetic measurement unit is preferably attached to a vehicle via a mechanism which automatically adjusts the height from road surface 100S to be constant. By setting the height of the magnetic measurement unit from road surface 100S to be constant, the magnetic distribution at the respective points on road surface 100S can be measured with high accuracy. If the measuring vehicle (omitted in the drawings) has a positioning system with high accuracy such as an RTK-GPS unit and IMU, it is possible to generate road-surface magnetic distribution M2 of magnetic data being quantities of magnetism measured by the magnetic measurement unit at the respective points on road surface 100S, in which magnetic data is associated with highly-accurate position data.

Figure 3:
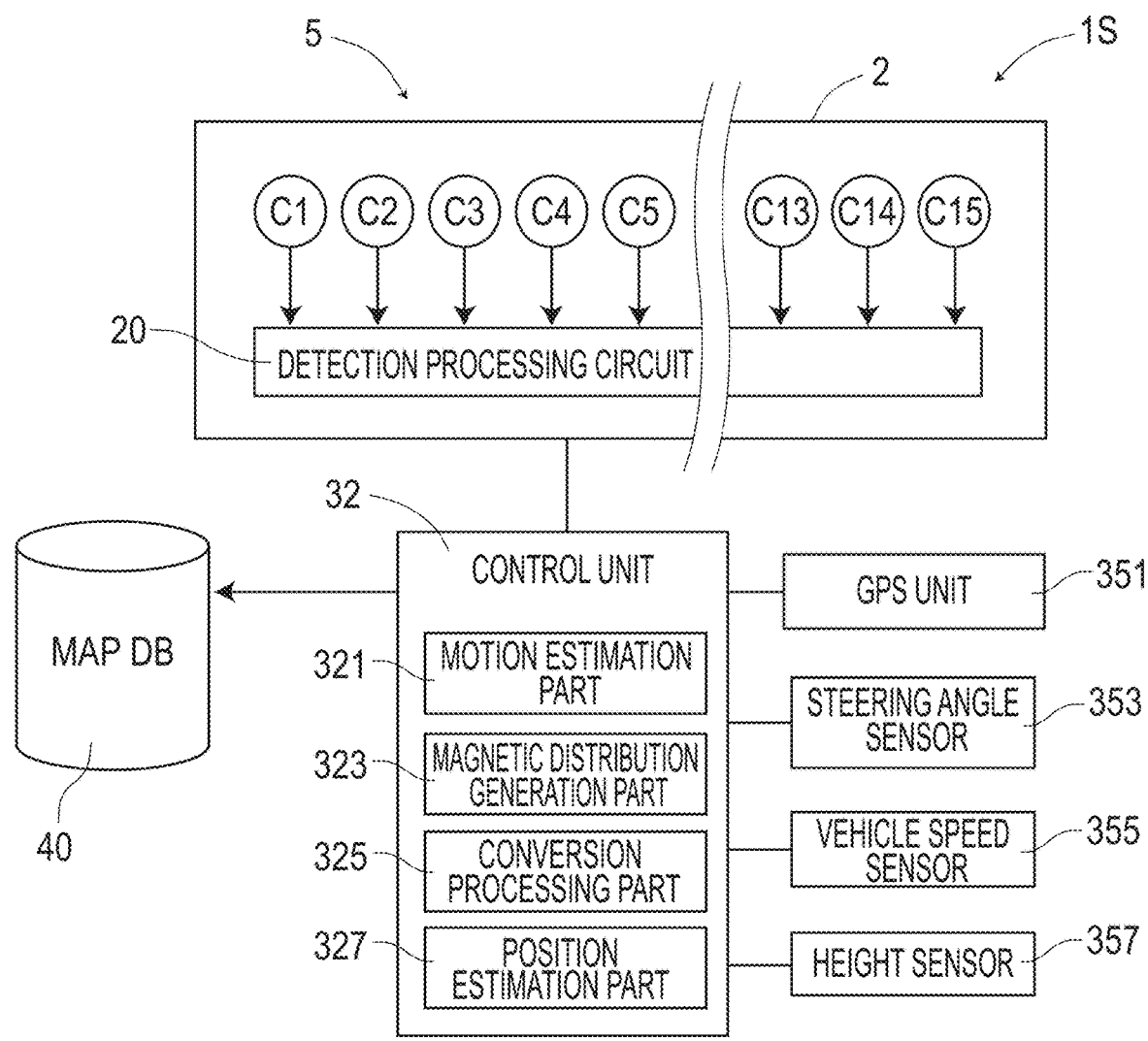
FIG. 3 is a block diagram depicting the configuration the vehicle has in the first embodiment.

Vehicle 5 configuring position estimation system 1S includes, as depicted in FIG. 2 and FIG. 3, sensor array 2 having a plurality of magnetic sensors Cn arrayed in the vehicle-width direction, map database (map DB) 40 storing map 1 (FIG. 1), control unit 32 which performs various calculations, and so forth. Furthermore, control unit 32 has connected thereto GPS unit 351 which performs positioning calculation using a GPS satellite, steering angle sensor 353 which detects a steering direction, vehicle speed sensor 355, height sensor 357 for measuring the height of sensor array 2, and so forth. Map DB 40 is one example of a storage part which stores map 1 with which road-surface magnetic distribution M2 is associated.

Height sensor 357 is an ultrasonic-type distance-measuring sensor. Height sensor 357 is attached near sensor array 2 so as to be able to measure the height of sensor array 2 from road surface 100S. The height to be measured by height sensor 357 is regarded as an attachment height of magnetic sensors Cn. Note that height sensors may be arranged at two or more locations in the vehicle-width direction so as to be able to adapt the tilt of a vehicle body by a roll. In this case, the attachment heights of the plurality of magnetic sensors Cn with different positions in the vehicle-width direction can be each grasped, and the tilt of the vehicle body can thereby be specified. Note that height sensor 357 may be a laser-type distance-measuring sensor.

Figure 4:
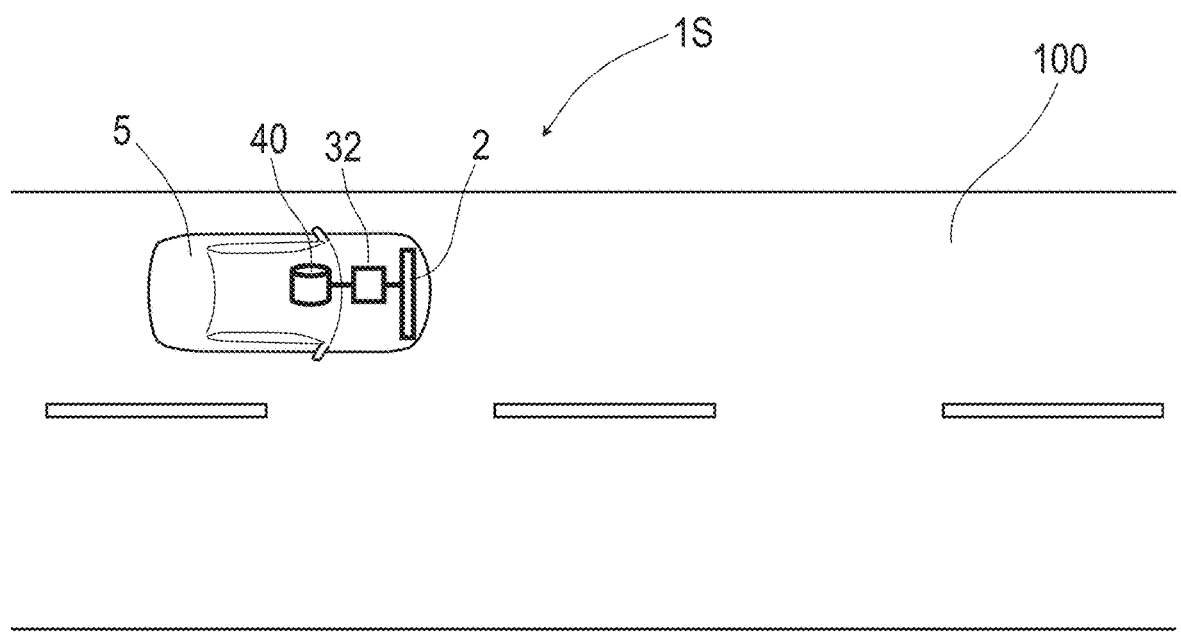
FIG. 4 is a top view of the vehicle in the first embodiment.

Sensor array 2 is an elongated-rod-shaped unit including fifteen magnetic sensors Cn (n is an integer of 1 to 15) and detection processing circuit 20 having a CPU not depicted and so forth incorporated therein. In sensor array 2, fifteen magnetic sensors Cn are arrayed on a straight line with constant (0.1 m) pitches. Sensor array 2 is attached, for example, inside the front bumper of vehicle 5 so as to be along the vehicle-width direction in a state of facing road surface 100S (FIG. 2 and FIG. 4). In the case of vehicle 5 of the present embodiment, the attachment height of sensor array 2 with reference to road surface 100S is 200 mm. Magnetic sensors Cn measure magnetism acting from a road surface 100S side.

Magnetic sensors Cn are sensors which detect magnetism by using the known MI effect (Magneto Impedance Effect) in which the impedance of a magneto-sensitive body such as an amorphous wire sensitively changes in response to the external magnetic field. Magnetic sensors Cn of the present embodiment has highly-sensitive detection performance with a measurement range of magnetic flux density of ±0.6 mT and a magnetic flux density resolution of 0.02 µT within the measurement range.

In each magnetic sensor Cn, magneto-sensitive bodies are arranged along orthogonal biaxial directions, allowing detection of magnetism acting in these orthogonal biaxial directions. In the present embodiment, magnetic sensors Cn are incorporated in sensor array 2 so that sensor array 2 attached to measuring vehicle 11 along the vehicle-width direction can detect magnetic components in a forwarding direction and the vehicle-width direction.

Note that the direction of magnetic components detected by magnetic sensor Cn may be in only one direction. In this case, magnetic sensors may be incorporated into the sensor array so as to detect magnetism acting in a vertical direction. A magnetic sensor which detects magnetism in triaxial directions orthogonal to one another may be adopted.

Detection processing circuit 20 (FIG. 3) is a circuit which detects magnetism by controlling magnetic sensors Cn and performs a process of measuring quantity of magnetism and so forth. This detection processing circuit 20 is configured by using, in addition to a CPU (central processing unit) which performs various calculations, memory elements such as a ROM (read only memory) and RAM (random access memory), and so forth. Detection processing circuit 20 controls magnetic sensors Cn so that magnetic measurement process is performed at a frequency of 3 kHz. With the magnetic measurement process, detection processing circuit 20 acquires magnetic components in the forwarding direction and the vehicle-width direction from each magnetic sensor Cn.

Detection processing circuit 20 composes magnetic components in the forwarding direction and magnetic components in the vehicle-width direction from each magnetic sensor Cn. Then, detection processing circuit 20 obtains, for each magnetic sensor Cn, the magnitude of magnetism acting along a horizontal plane defined by the forwarding direction and the vehicle-width direction, and externally outputs fifteen pieces of magnetic data being magnetic measurement values of respective magnetic sensors Cn. Here, in the present embodiment, the magnetic measurement values of magnetic sensors Cn themselves are adopted as magnetic data.

As described above, sensor array 2 is attached to vehicle 5 so that fifteen magnetic sensors Cn are positioned along the vehicle-width direction with 0.1-m pitches. Magnetic data being fifteen magnetic measurement values of magnetic sensors Cn outputted from sensor array 2 indicates a magnetic distribution in a one-dimensional range (hereinafter referred to as a one-dimensional magnetic distribution) having a width of 1.5 m (0.1×15) in the vehicle-width direction.

Control unit 32 is a unit which performs calculations for estimating the own vehicle position on map 1 (refer to FIG. 1) and so forth. Control unit 32 includes an electronic substrate (omitted in the drawings) having, in addition to a CPU which performs various calculations, memory elements such as a ROM and RAM and so forth implemented thereon. Control unit 32 includes functions as motion estimation part 321, magnetic distribution generation part 323, conversion processing part 325, and position estimation part 327.

Motion estimation part 321 performs a motion estimation process of estimating a motion of vehicle 5. Although details are described further below with reference to FIG. 6, motion estimation part 321 estimates a motion of vehicle 5 by resolving the motion of vehicle 5 into a component of translational motion without a change in orientation and a component of rotational motion being a change in orientation.

Magnetic distribution generation part 323 performs a magnetic distribution generation process for generating a two-dimensional measured magnetic distribution based on the one-dimensional magnetic distribution acquired from sensor array 2. Magnetic distribution generation part 323 generates a measured magnetic distribution by using the motion of vehicle 5 estimated by motion estimation part 321. This measured magnetic distribution is a two-dimensional distribution of magnetic measurement values acquired from the magnetic measurement process.

Conversion processing part 325 performs a conversion process for converting road-surface magnetic distribution M2 associated with map 1 into a magnetic distribution suitable for collation with the measured magnetic distribution. Conversion processing part 325 performs the conversion process on road-surface magnetic distribution M2, and convert to a magnetic distribution at the attachment height of magnetic sensors Cn (referred to as a converted magnetic distribution as appropriate).

Position estimation part 327 performs a position estimation process of estimating the own vehicle position on map 1. Position estimation part 327 specifies an area corresponding to the measured magnetic distribution with reference to map 1, and estimates the own vehicle position based on the position of this corresponding area on map 1. Specifically, position estimation part 327 specifies an area corresponding to the measured magnetic distribution in road-surface magnetic distribution M2 configuring map 1.

Figure 5:
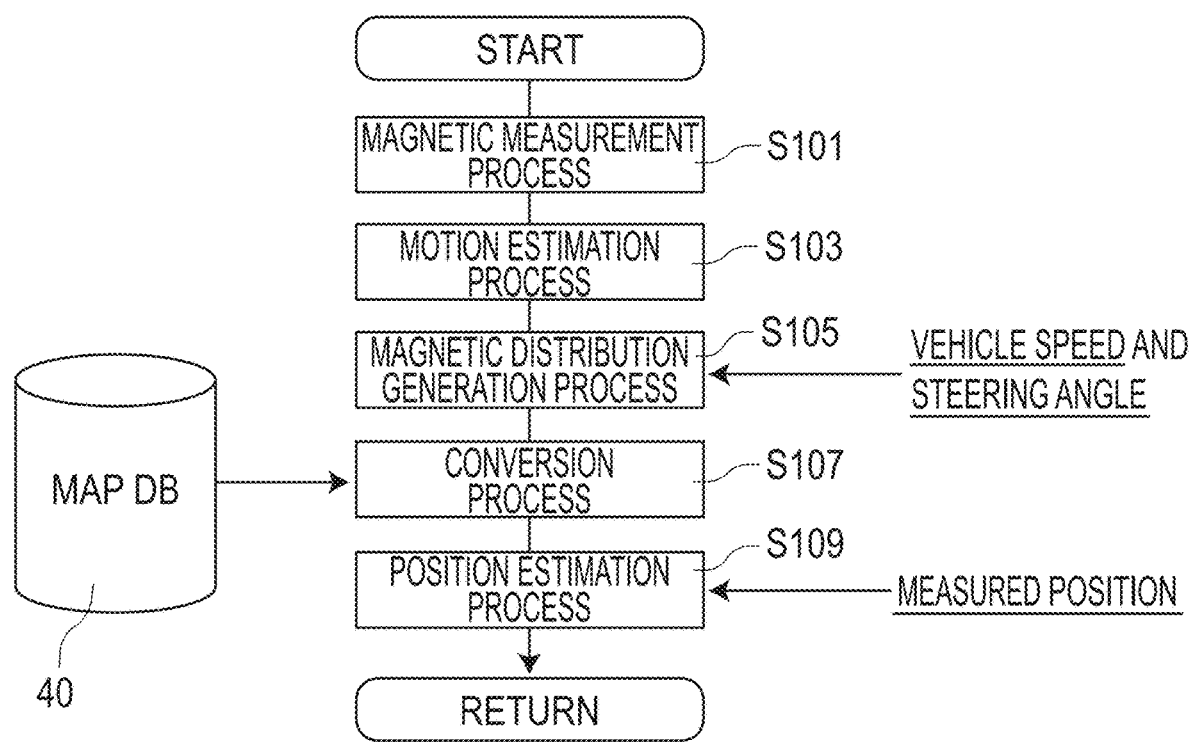
FIG. 5 is a flow diagram depicting a procedure of a position estimation method in the first embodiment.

Vehicle 5 repeatedly performs a process flow of FIG. 5 during traveling to estimate the own vehicle position. During traveling of vehicle 5, sensor array 2 performs a magnetic measurement process to acquire a one-dimensional magnetic distribution and inputs it to control unit 32 (S101). Control unit 32 estimates a motion of vehicle 5 based on a measured vehicle speed and a measured steering angle (S103, motion estimation process) to estimate a positional displacement in a one-dimensional area on the road surface sensor array 2 faces.

Control unit 32 accumulates one-dimensional magnetic distributions acquired by sensor array 2, according to positional displacements of one-dimensional areas on the road where surface sensor array 2 faces, to generate a two-dimensional measured magnetic distribution (S105, magnetic distribution generation process). Also, control unit 32 converts road-surface magnetic distribution M2 associated with structure map M1 (refer to FIG. 1) into a converted magnetic distribution which is a magnetic distribution at the attachment height of magnetic sensors Cn (S107, conversion process). Then, control unit 32 specifies an area in road-surface magnetic distribution M2 corresponding to the measured magnetic distribution, and thereby estimates the own vehicle position (S109, position estimation process).

Next, details of (A) magnetic measurement process, (B) motion estimation process, (C) magnetic distribution generation process, (D) conversion process, and (E) position estimation process configuring the process flow of FIG. 5 are described.

(A) Magnetic Measurement Process

The magnetic measurement process is a process to be performed by sensor array 2. Sensor array 2 performs the magnetic measurement process by fifteen magnetic sensors Cn at a frequency of 3 kHz. Sensor array 2 acquires fifteen magnetic measurement values from magnetic sensor Cn at a frequency of 3 kHz, and inputs magnetic data being fifteen magnetic measurement values to control unit 32 at the same frequency. As described above, the magnetic data being fifteen magnetic measurement values to be inputted by sensor array 2 to control unit 32 indicates a distribution of one-dimensional discrete values along the vehicle-width direction. The width of this one-dimensional magnetic distribution, which is the distribution of one-dimensional discrete values, is 1.5 meters equal to the range where magnetic sensors Cn are arranged in sensor array 2. Note that sensor array 2 links identification information to the one-dimensional magnetic distribution and inputs it to the control unit 32. Identification information linked to the one-dimensional magnetic distribution can be used to identify the one-dimensional magnetic distribution configuring the measured magnetic distribution.

(B) Motion Estimation Process

The motion estimation process is a process to be performed by control unit 32 (motion estimation part 321) to estimate a motion of vehicle 5. Control unit 32 estimates the motion of vehicle 5 by using the measured vehicle speed from vehicle speed sensor 355 and the measured steering angle from the steering angle sensor 353. As described further below, control unit 32 of the present embodiment estimates a motion of vehicle 5 by resolving into a component of translational motion and a component of rotational motion.

Control unit 32 estimates a motion of vehicle 5 in an interval period (during 1/3000 seconds) of the magnetic measurement process performed at the frequency of 3 kHz by using the measured vehicle speed and the measured steering angle. This motion of vehicle 5 is a motion of moving forward at a speed of the measured vehicle speed during 1/3000 seconds along a steering direction specified by the measured steering angle. Note that control unit 32 of the present embodiment sets the center of sensor array 2 (position of magnetic sensor C8) as a representative point of vehicle 5 and estimates a motion of the center of sensor array 2.

Figure 6:
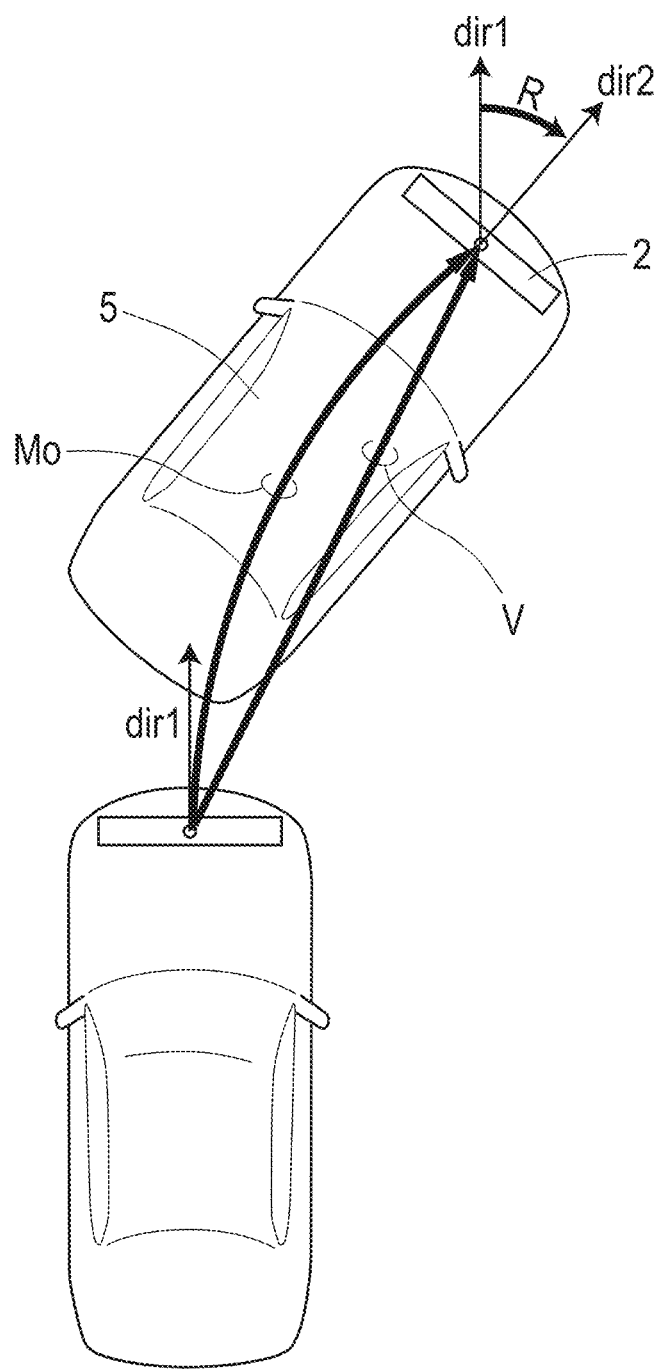
FIG. 6 is a descriptive diagram of a motion estimation process in the first embodiment.

When vehicle 5 travels a curve, the motion of the center of sensor array 2 is, for example, motion Mo indicated by an arc-shaped arrow in FIG. 6. This motion Mo can be resolved into vector V in the drawing indicating a component of translational motion and turn angle R indicating a component of rotational motion. In the motion estimation process, motion Mo of vehicle 5 is estimated by resolving into vector V and turn angle R. If vector V and turn angle R are determined with reference to a position of the vehicle, the position and orientation of the vehicle after displacement are uniquely determined.

As described above, in the present embodiment, the center of sensor array 2 is set as a representative point of vehicle 5. For this reason, a one-dimensional area on road surface 100S facing sensor array 2 and positional displacement of the one-dimensional magnetic distribution, which is a magnetic distribution of this one-dimensional area, match with motion Mo of vehicle 5. The one-dimensional area on road surface 100S facing sensor array 2 and positional displacement of the one-dimensional magnetic distribution can be specified by vector V and turn angle R estimated in the above-described motion estimation process.

(C) Magnetic Distribution Generation Process

The magnetic distribution generation process is a process to be performed by control unit 32 (magnetic distribution generation part 323) to generate a measured magnetic distribution, which is a magnetic distribution on road surface 100S measured by using sensor array 2. The control unit 32 captures the above-described one-dimensional magnetic distribution configured of magnetic data being fifteen magnetic measurement values by sensor array 2 at the frequency of 3 kHz to generate a two-dimensional measured magnetic distribution.

The measured magnetic distribution is acquired by sensor array 2 of vehicle 5 scanning road surface 100S in a manner like a "line scanner". An area of this measured magnetic distribution is an area scanned by sensor array 2. When acquiring a new one-dimensional magnetic distribution and incorporating it into the measured magnetic distribution, control unit 32 deletes the one-dimensional magnetic distribution that is most obsolete in terms of acquisition time. According to this procedure, a magnetic distribution of a two-dimensional area with a width of 1.5 meters taking a one-dimensional area on road surface 100S facing sensor array 2 as a start point and extending along a traveling path of vehicle 5 can be generated as a measured magnetic distribution. Note in the present embodiment that the number of times of incorporation of a one-dimensional magnetic distribution is variable in accordance with the vehicle speed so that the dimension of the measured magnetic distribution in a longitudinal direction (corresponding to the traveling direction of the vehicle) has a predetermined distance. The dimension of the measured magnetic distribution in the longitudinal direction is preferably, for example, on the order of 2 meters to 10 meters.

Figure 7:
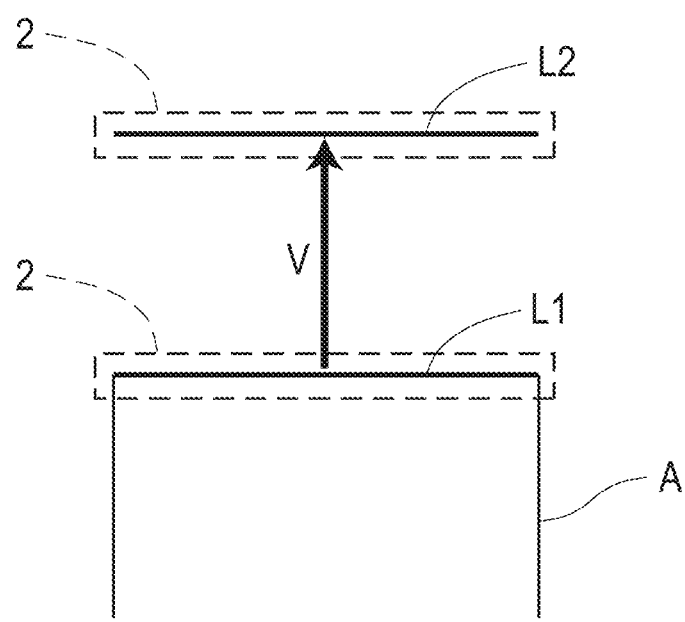
FIG. 7 is a diagram exemplarily depicting a motion estimation result when the vehicle is in a straight forwarding state in the first embodiment.
Figure 8:
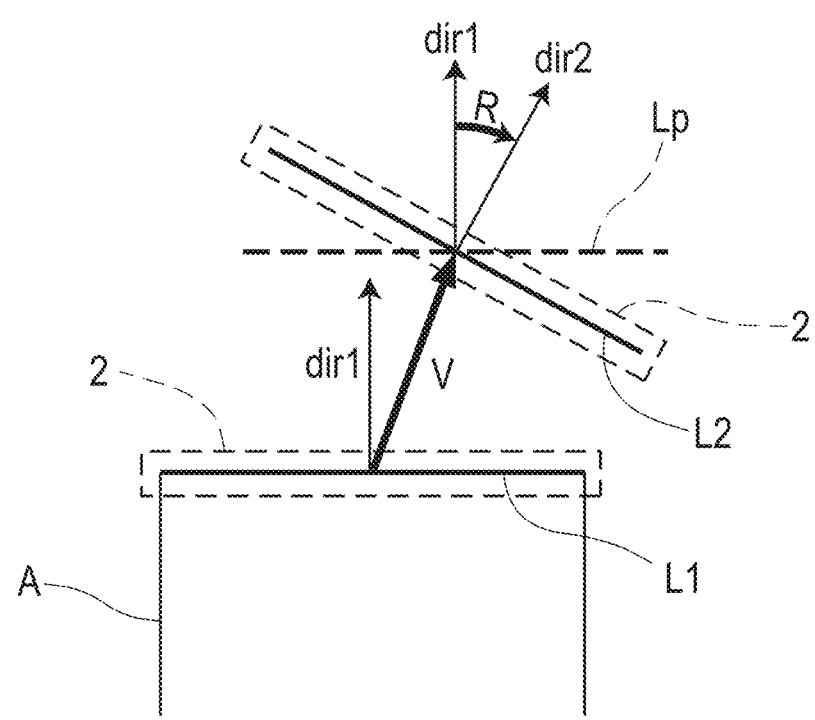
FIG. 8 is a diagram exemplarily depicting a motion estimation result when the vehicle is in a cornering state in the first embodiment.

A positional relation between existing measured magnetic distribution A and one-dimensional magnetic distribution L2 to be newly incorporated into the measured magnetic distribution is described by using FIG. 7 and FIG. 8. A positional relation between newest one-dimensional magnetic distribution L1 in existing measured magnetic distribution A and one-dimensional magnetic distribution L2 to be newly incorporated can be represented with vector V and turn angle R estimated in the motion estimation process.

FIG. 7 depicts the positional relation between one-dimensional magnetic distributions L1 and L2 when, for example, vehicle 5 travels straight forward. In this case, vector V orthogonal to the longitudinal direction of one-dimensional magnetic distribution L1 determines the position of one-dimensional magnetic distribution L2 to be newly incorporated into measured magnetic distribution A. FIG. 8 depicts a positional relation between L1 and L2 when, for example, vehicle 5 travels a curve. In this case, rotating, by turn angle R, one-dimensional range Lp determined by vector V inclined with respect to one-dimensional magnetic distribution L1 determines the position and orientation (posture) of one-dimensional magnetic distribution L2. In FIG. 8, dir1 indicates a direction orthogonal to one-dimensional magnetic distribution L1 and one-dimensional range Lp, and dir2 indicates a direction orthogonal to one-dimensional magnetic distribution L2. Turn angle R is an angle formed by dir1 and dir2.

Figure 9:
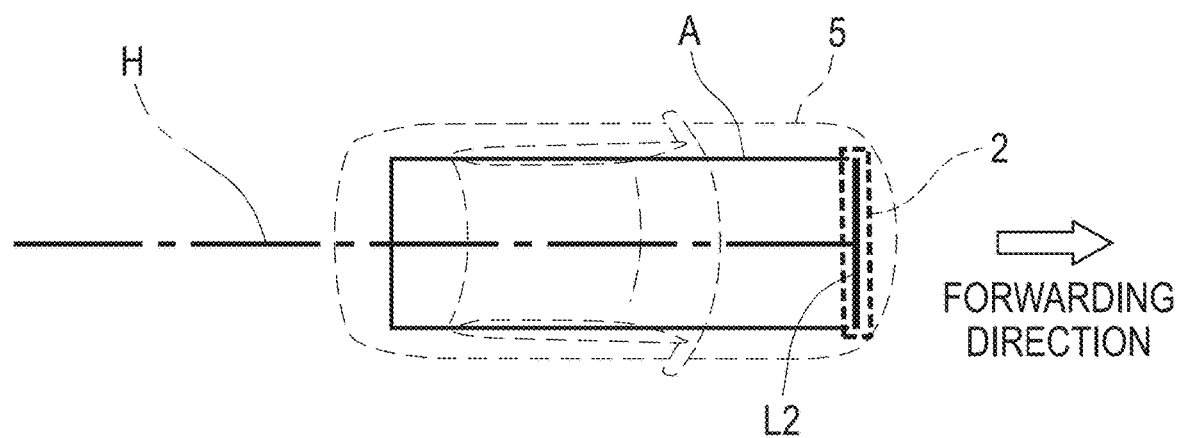
FIG. 9 is a diagram exemplarily depicting an area of a measured magnetic distribution when the vehicle is in a straight forwarding state in the first embodiment.
Figure 10:
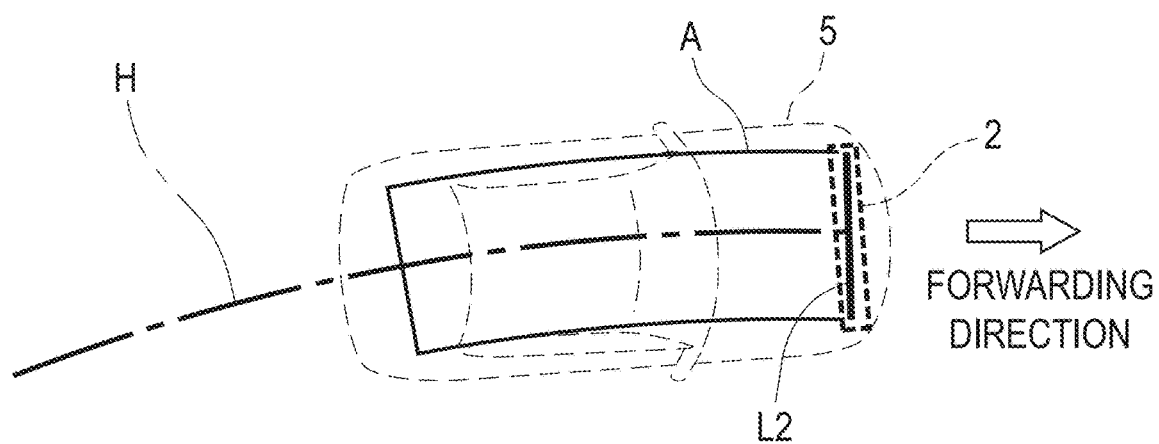
FIG. 10 is a diagram exemplarily depicting an area of a measured magnetic distribution which the vehicle is in a cornering state in the first embodiment.
Figure 11:
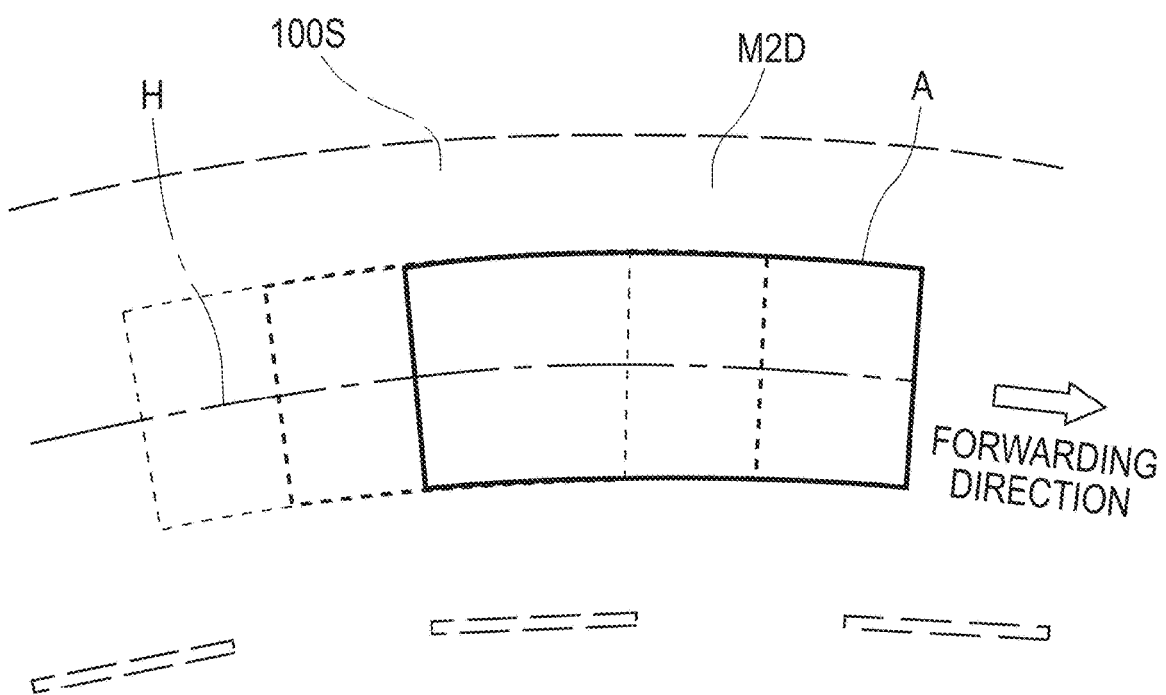
FIG. 11 is a descriptive diagram of a process of collating a converted magnetic distribution based on a road-surface magnetic distribution and the measured magnetic distribution in the first embodiment.

When vehicle 5 travels straight forward, as in FIG. 9, rectangular-shaped measured magnetic distribution A taking one-dimensional magnetic distribution L2 of an area facing sensor array 2 as an end portion and extending along traveling path H of vehicle 5 is formed. When vehicle 5 is traveling a curve, as in FIG. 10, measured magnetic distribution A taking one-dimensional magnetic distribution L2 of an area facing sensor array 2 as an end portion and extending along traveling path H of vehicle 5 in a curved shape is formed.

(D) Conversion Process

The conversion process is a process of converting road-surface magnetic distribution M2 (magnetic distribution of the road surface) configuring map 1 (refer to FIG. 1) into a mode that is easy to be collated with measured magnetic distribution A. Control unit 32 performs a simulation of estimating a distribution of quantities of magnetism acting the respective points at a predetermined height from the road surface. By performing this simulation, control unit 32 converts road-surface magnetic distribution M2 into converted magnetic distribution M2D (refer to FIG. 11), which is a magnetic distribution at the attachment height of magnetic sensors Cn (refer to FIG. 11).

(E) Position Estimation Process

The position estimation process is a process to be performed by control unit 32 (position estimation part 327) to estimate the own vehicle position on the map. Control unit 32 collates converted magnetic distribution M2D based on road-surface magnetic distribution M2 and measured magnetic distribution A (FIG. 11) and thereby specifies an area corresponding to measured magnetic distribution A in road-surface magnetic distribution M2. Specifically, control unit 32 performs a correlation operation between converted magnetic distribution M2D and measured magnetic distribution A, and specifies an area with a high degree of matching with measured magnetic distribution A in converted magnetic distribution M2D. Note that if a correlation operation between converted magnetic distribution M2D and measured magnetic distribution A is tried to be performed in entire road surface 100S, there is a possibility that the amount of operation is enormous. By referring to a measured position by GPS unit 351 and performing a collation with measured magnetic distribution A by limiting to a nearby range with reference to that measured position, the amount of operation required for the above-described correlation operation can be suppressed.

The position estimation process is a process of calculating a cross-correlation coefficient normalized by a correlation operation of Equation 1. Equation 1 is an equation of calculating a cross-correlation coefficient indicating a degree of matching between converted magnetic distribution M2D and measured magnetic distribution A when measured magnetic distribution A is superposed on an area represented by specific coordinates (u, v) in converted magnetic distribution M2D. In particular, Equation 1 is an arithmetic equation of a normalized cross-correlation coefficient, and maximum cross-correlation coefficient 1 is obtained when converted magnetic distribution M2D and measured magnetic distribution A match.

$$C_{u,v} = \frac{\sum_{x=u}^{u+Nx-1} \sum_{y=v}^{v+Ny-1} (f_{x,y} - \overline{f}_{u,v})(t_{x-u,y-v} - \overline{t})}{\sqrt{\sum_{x=u}^{u+Nx-1} \sum_{y=v}^{v+Ny-1} (f_{x,y} - \overline{f}_{u,v})^2} \sqrt{\sum_{x=u}^{u+Nx-1} \sum_{y=v}^{v+Ny-1} (t_{x-u,y-v} - \overline{t})^2}}$$ (Equation 1)

$$\overline{f}_{u,v} = \frac{1}{NxNy} \sum_{x=u}^{u+Nx-1} \sum_{y=v}^{v+Ny-1} f_{x,y}$$

$$\overline{t} = \frac{1}{NxNy} \sum_{x=0}^{Nx-1} \sum_{y=0}^{Ny-1} t_{x,y}$$

Here, f indicates converted magnetic distribution M2D, and t indicates measured magnetic distribution A. The area size of measured magnetic distribution A is Nx×Ny, and the area size of converted magnetic distribution M2D is sufficiently larger than measured magnetic distribution A.

In Equation 1, changing (u, v) means that an area to be superposed on measured magnetic distribution A is changed in converted magnetic distribution M2D. Calculating cross-correlation coefficients for various coordinates (u, v) corresponds to, for example, as in FIG. 11, checking a degree of matching while the position of measured magnetic distribution A is shifted with respect to converted magnetic distribution M2D. An area corresponding to coordinates (u0, v0) when a cross-correlation coefficient closest to 1, which is the maximum correlation value, is obtained from among the cross-correlation coefficients calculated for various coordinates (u, v) can be specified as an area corresponding to measured magnetic distribution A. If the area corresponding to measured magnetic distribution A in converted magnetic distribution M2D based on road-surface magnetic distribution M2 can be specified, the own vehicle position in road-surface magnetic distribution M2 can be estimated. Road-surface magnetic distribution M2 is associated with structure map M1 (refer to FIG. 1) by position data indicating absolute positions. Estimating the own vehicle position in road-surface magnetic distribution M2 is synonymous with estimating the own vehicle position on the map.

When a correlation operation is performed at respective coordinates (u, v), measured magnetic distribution A may be rotated to calculate a cross-correlation coefficient for each rotation angle. Here, it is preferable to limit the range of rotation angles for performing cross-correlation by assuming driving situations such as a lane change in which the forwarding direction of vehicle 5 is shifted in angle with respect to the direction of road 100. By calculating a cross-correlation coefficient by rotating measured magnetic distribution A, the own vehicle position can be estimated not only when vehicle 5 travels along road 100 but also during a lane change or the like. To calculate a cross-correlation coefficient for each coordinate or for each rotation angle, not only the position of vehicle 5 but also the azimuth (posture) of vehicle 5 can be estimated.

As described above, position estimation system 1S of the present embodiment is a system which estimates the own vehicle position on the map by using road-surface magnetic distribution M2, which is a magnetic distribution at the respective points on road surface 100S. If the own vehicle position on the map can be estimated, various driving assist controls can be achieved, including lane following control and automatic driving.

In road-surface magnetic distribution M2 configuring map 1, the magnitude of the quantity of magnetism is formed depending on magnetism generation sources, such as the magnetic material mixed into the pavement material forming road surface 100S, a metal-made manhole installed on road surface 100S, and a joint of a bridge. Since these magnetism generation sources are positionally fixed onto road surface 100S, positional fluctuations are small. By using road-surface magnetic distribution M2 derived from the positionally-fixed magnetism generation sources, the own vehicle position on the map can be estimated with high accuracy.

Note that, as described above, when the position estimation process is first performed, for example, the use of the measured position by GPS unit 351 is effective. By using the measured position, the range in which measured magnetic distribution A is collated in road-surface magnetic distribution M2 can be limited, and the amount of operation required for a correlation operation between converted magnetic distribution M2D and measured magnetic distribution A can be suppressed. Furthermore, after the own vehicle position is estimated, the own vehicle position after displacement is preferably predicted by motion estimation of vehicle 5. By predicting the own vehicle position after displacement, the collation range of measured magnetic distribution A can be limited in road-surface magnetic distribution M2 (converted magnetic distribution M2D), and efficiency of correlation operation can be improved.

Figure 12:
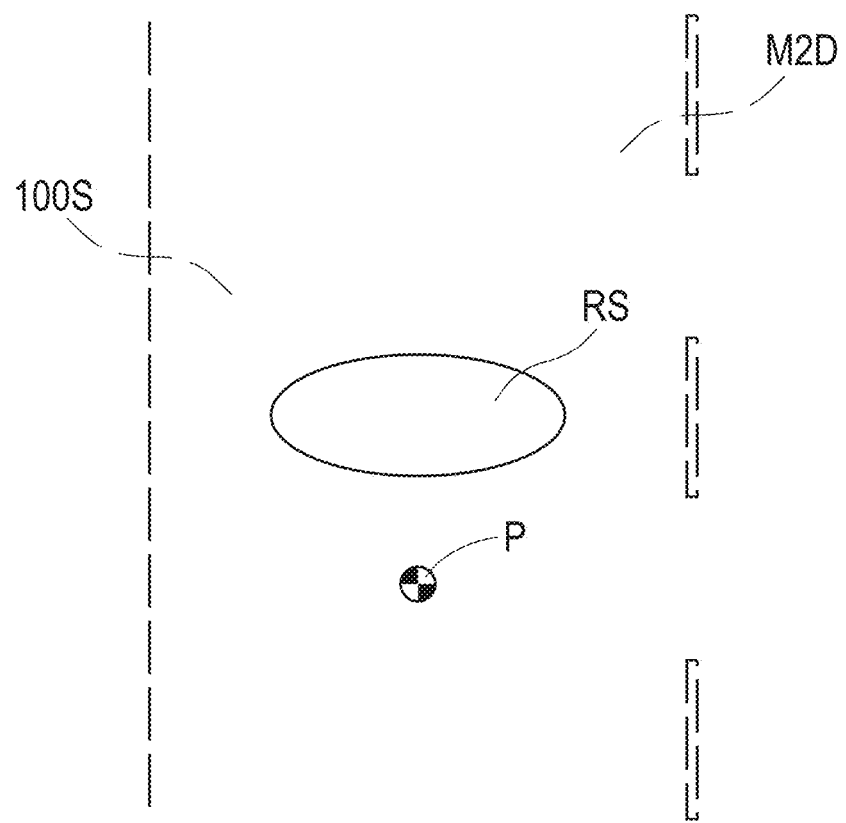
FIG. 12 is a diagram exemplarily depicting a collation range of a one-dimensional magnetic distribution in the first embodiment.

Furthermore, after the own vehicle position is estimated, for example, as in FIG. 12, range RS as a candidate of the own vehicle position (in the present embodiment, the position of the center of sensor array 2) is preferably set with reference to estimated own vehicle position P. Since this range RS is a candidate of an area sensor array 2 faces after displacement, it is preferable to collate one-dimensional magnetic distribution by the magnetic measurement process in this range RS. In this manner, after estimation of the own vehicle position, the own vehicle position can be estimated by collating the one-dimensional magnetic distribution in range RS of FIG. 12. A correlation operation of a one-dimensional magnetic distribution is efficient because it needs an amount of operation smaller than that of a correlation operation of a two-dimensional magnetic distribution.

By collating road-surface magnetic distribution M2 (converted magnetic distribution M2D) and measured magnetic distribution A or the one-dimensional magnetic distribution acquired by vehicle 5, the position and posture of measured magnetic distribution A or the one-dimensional magnetic distribution can be specified in road-surface magnetic distribution M2. For example, after the own vehicle position can be estimated, by specifying the position and posture of measured magnetic distribution A or the one-dimensional magnetic distribution in road-surface magnetic distribution M2, changes in relative position or azimuth (orientation or posture of the vehicle) can be grasped with reference to the estimated own vehicle position. In this manner, the configuration of estimating the position of vehicle 5 by collating road-surface magnetic distribution M2 (converted magnetic distribution M2D) and measured magnetic distribution A or the one-dimensional magnetic distribution can be an alternative to an IMU.

In the present embodiment, to suppress the amount of operation of the position estimation process and efficiently perform the position estimation process, the configuration of using the measured position by GPS unit 351 is exemplarily described. In place of the GPS use, a communication unit such as a radio beacon or infrared beacon installed on a road side or the like may be used. When vehicle 5 is equipped with a receiving unit, the own vehicle position can be broadly grasped in response to reception of a beacon wave. Furthermore, by processing an image taken by a front camera, the name of an intersection, a placename, and so forth may be recognized to broadly grasp the own vehicle position. Alternatively, the own vehicle position may be broadly grasped by collation with foreground images stored in a vehicle onboard database or a database accessible via the Internet or the like. If the own vehicle position can be broadly grasped, suppression of the amount of operation required for correlation operation or the like in the position estimation process can be achieved.

In the present embodiment, an automatic driving system is exemplarily described as a system to be combined with position estimation system 1S. In place of the automatic driving system, a departure warning system which warns a departure from a lane or a lane keep system which automatically steers a steering wheel along a lane or causes a steering assist force for avoiding a departure from a lane may be applied.

Note that when vehicle 5 is connectable to a communication line such as the Internet, the function of map DB 40 may be provided to a server device. Vehicle 5 preferably transmits information required for estimating the own vehicle position to the server device. The functions of performing the magnetic distribution generation process and the position estimation process may be provided to the server device. In this case, every time the magnetic measurement process is performed, it is only required that the one-dimensional magnetic distribution be transmitted from vehicle 5 to the server device. By using the one-dimensional magnetic distribution received from the vehicle, the server device can estimate the own vehicle position of the transmission-source vehicle and make a reply.

In the present embodiment, conversion into a magnetic distribution at the attachment height of magnetic sensors Cn (converted magnetic distribution) is performed based on road-surface magnetic distribution M2 to perform collation with measured magnetic distribution. In place of this, the measured magnetic distribution may be converted into a magnetic distribution on road surface 100S to perform collation with road-surface magnetic distribution M2. Alternatively, the measured magnetic distribution may be directly collated without converting road-surface magnetic distribution M2 or the like.

To make a conversion into a magnetic distribution at the attachment height of magnetic sensors Cn based on road-surface magnetic distribution M2, the attachment height of magnetic sensors Cn is measured by using height sensor 357. Then, by a simulation in consideration of this attachment height, road-surface magnetic distribution M2 is converted into a magnetic distribution at the attachment height of magnetic sensors Cn to acquire a converted magnetic distribution. In place of height sensor 357, a storage part which stores the attachment height of magnetic sensors Cn as a setting value may be provided.

Two or more magnetic sensors at different heights may be arranged along the vertical direction. In this case, a ratio (such as attenuation ratio) of magnetic measurement values from two magnetic sensors arranged along the vertical direction can be specified. Then, by performing a simulation operation including, as a variable, the ratio of magnetic measurement values by two magnetic sensors with a known height difference, road-surface magnetic distribution M2 can be converted into a magnetic distribution at the attachment height of magnetic sensors Cn.

Furthermore, for example, magnetic markers with known quantity of magnetism may be laid on road surface 100S. In this case, for the magnetic markers, an attenuation ratio of the quantity of magnetism measured by magnetic sensors Cn is preferably calculated. By using the attenuation ratio of the quantity of magnetism, conversion into a magnetic distribution at the attachment height of magnetic sensors Cn can be made based on the road-surface magnetic distribution.

Note that the road surface may be paved by using a pavement material having a magnetic material such as magnetic powder of iron oxide mixed therewith. In this case, the magnetic material in the pavement material is magnetized, and undulations of road-surface magnetic distribution M2 tend to increase. When the undulations of the magnetic distribution expand, collation between magnetic distributions becomes easy and accuracy can be improved. Note that it is also preferable to magnetize unevenly the road surface paved with the pavement material having the magnetic material mixed therewith. In this case, the undulations of the magnetic distribution can be further expanded, and collation between magnetic distributions becomes easy. A pavement material having a magnetic material mixed therewith and a normal pavement material not including a magnetic material may be prepared. In this case, the pavement materials of two types may be supplied unevenly to the road surface without being mixed together. Since a difference in composition ratio of the magnetic materials occurs in accordance with the position on the road surface, this can expand the undulations of the magnetic distribution.

After paved by using the pavement material having the magnetic material mixed therewith, the road surface may be magnetized. For example, the road surface may be magnetized so that a predetermined pattern is formed, such as, for example, a checkered pattern in which a rectangular area with strong magnetism and a rectangular area with weak magnetism alternately appear. By using the pattern formed with strong and weak magnetisms, collation between magnetic distributions becomes easy, and position estimation accuracy can be improved. Also, when the road surface is magnetized so as to form a predetermined pattern, for example, by using a dividing line between a rectangular area with a large quantity of magnetism and a rectangular area with a small quantity of magnetism, collation with the measured magnetic distribution can be efficiently performed. For example, when the measured magnetic distribution includes a dividing line, it is only required that collation be performed by presuming coincidence with a dividing line in road-surface magnetic distribution M2. The predetermined pattern may be an information-readable pattern such as a one-dimensional or two-dimensional barcode.

Furthermore, road surface 100S may be magnetized so that a magnetic singular point appears on road surface 100S paved with the pavement material having the magnetic material mixed therewith. In this manner, by creating magnetic singular points with magnetic powder of iron oxide or the like, collation between magnetic distributions becomes easy. By presuming coincidence of singular points, combinations where the singular points do not coincide can be eliminated at the time of collation between magnetic distributions, allowing collation to be efficiently performed.

Also, a pavement material having a magnetic material mixed therewith and a normal pavement material not including a magnetic material may be prepared. In this case, the type of pavement material may be switched for each area. In this case, the magnetic material is condensed or scarce for each area, the undulations of the magnetic distribution can be expanded, allowing collation between magnetic distributions to be easily made.

In the present embodiment, collation with the measured magnetic distribution, which is a two-dimensional magnetic distribution obtained by accumulating one-dimensional magnetic distributions by the magnetic measurement process, is performed. Collation with a temporal distribution of magnetic measurement values of any one of magnetic sensors Cn, that is, a one-dimensional distribution along the traveling path of the vehicle, may be performed. A sensor array having magnetic sensors two-dimensionally arrayed may be adopted. In this case, collation with a two-dimensional magnetic distribution measured by this sensor array can be performed. Alternatively, a plurality of sensor arrays with the same specification as that of sensor array 2 described above may be prepared and arranged at a plurality of locations in the forwarding direction of the vehicle. In this case, a plurality of one-dimensional magnetic distributions with a known relative positional relation can be acquired. Collation among the plurality of these one-dimensional magnetic distributions may be performed. The plurality of sensor arrays may be attached so as to be parallel to one another or intersect to form an L shape or cross shape.

Note that the road-surface magnetic distribution may be a distribution of magnetic gradients, which are one example of magnetic data based on the quantities of magnetism at the respective points on the road surface. A magnetic gradient can be calculated as, for example, a difference in the quantity of magnetism between adjacent points. Also, the measured magnetic distribution to be collated with the road-surface magnetic distribution of magnetic gradients is preferably a distribution of magnetic gradients based on magnetic measurement values. The magnetic gradient can be calculated as, for example, a difference between magnetic measurement values of adjacent magnetic sensors among magnetic sensors Cn configuring sensor array 2.

In the magnetic gradient, a magnetic component acting uniformly or almost uniformly on the magnetic sensor is suppressed. For this reason, in the magnetic gradient, a magnetic component acting from a magnetism generation source that is present relatively far away is suppressed, and a magnetic component acting from a magnetism generation source that is present relatively near, such as one on the road surface or the like, is relatively emphasized. Therefore, to estimate the position using a magnetic pattern on the road surface the magnetic sensor faces, the use of a magnetic gradient distribution is suitable. By using the magnetic gradient distribution, influences by magnetism generation sources such as surrounding vehicles, guardrails, and billboards and influences by terrestrial magnetism can be suppressed, and position estimation accuracy can be improved.

Note that, for example, a difference between magnetic measurement values with different acquisition times may be converted into a difference per distance specified based on vehicle speed information separately provided. A difference per distance may be calculated in advance for two magnetic sensors, and a difference may be further taken between the two magnetic sensors to calculate a magnetic gradient. In this case, an effect can be expected in which the above-described magnetic gradient can be calculated without providing in advance a spacing between magnetic markers arranged on the road. Furthermore, for example, to calculate a magnetic gradient from a difference between magnetic measurement values at different times from one magnetic sensor, a magnetic gradient may be calculated from a difference per distance specified by vehicle-speed information separately provided. In this case, the necessity to set two vehicle-onboard sensor units at the front and rear is lessened. If a magnetic gradient can be calculated by one sensor unit, effects can be expected in which the design load of allocating positions for mounting the sensor units can be reduced, and the cost of mounting sensor units can be reduced.

Second Embodiment

The present embodiment is an example of application of position estimation system 1S to road 100 where magnetic markers 10 are laid. Details of this are described with reference to FIG. 3 and FIG. 13 to FIG. 18.

Figure 13:
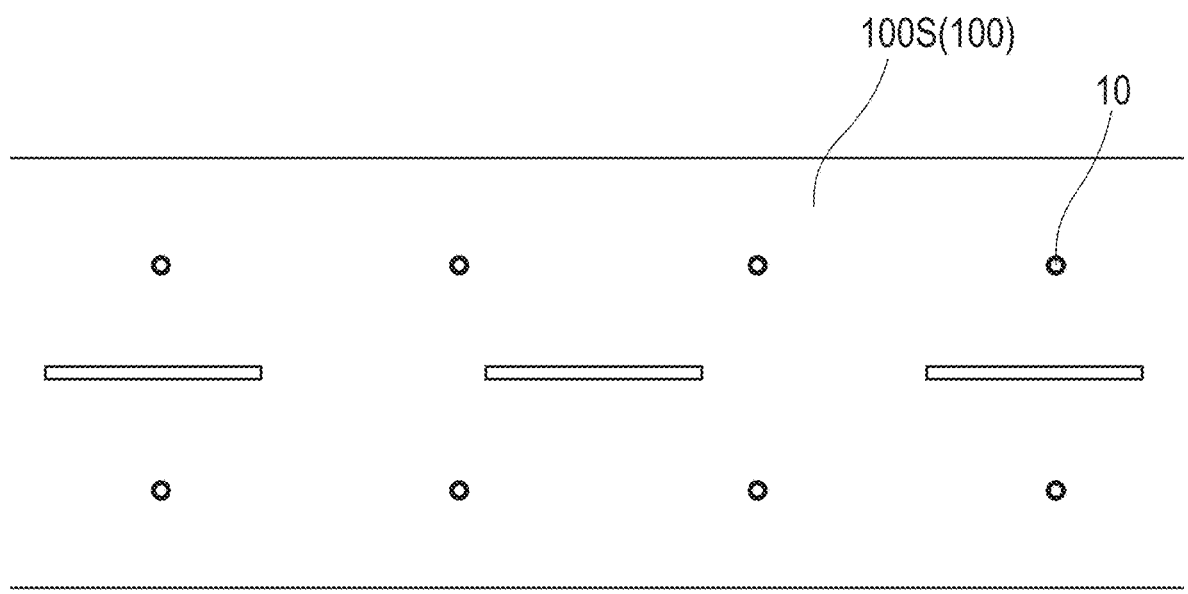
FIG. 13 is a top view of a road where magnetic markers are laid in a second embodiment.
Figure 14:
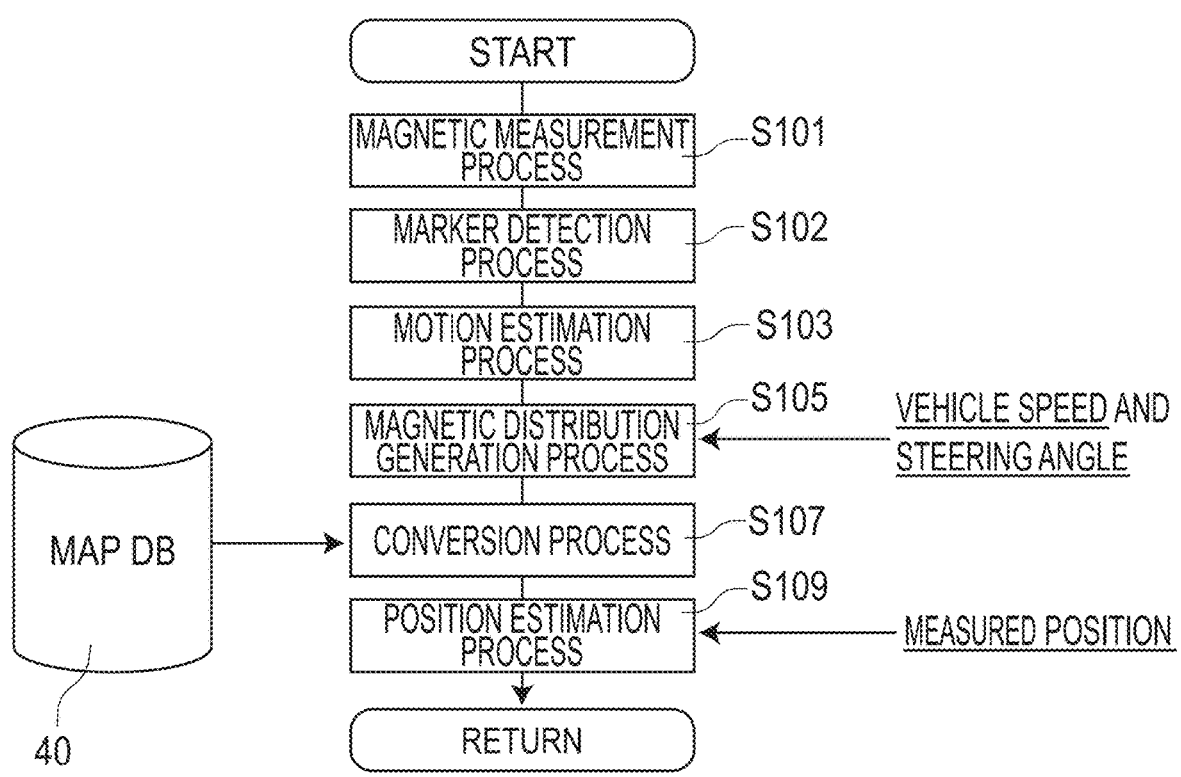
FIG. 14 is a flow diagram depicting a procedure of a position estimation method in the second embodiment.
Figure 15:
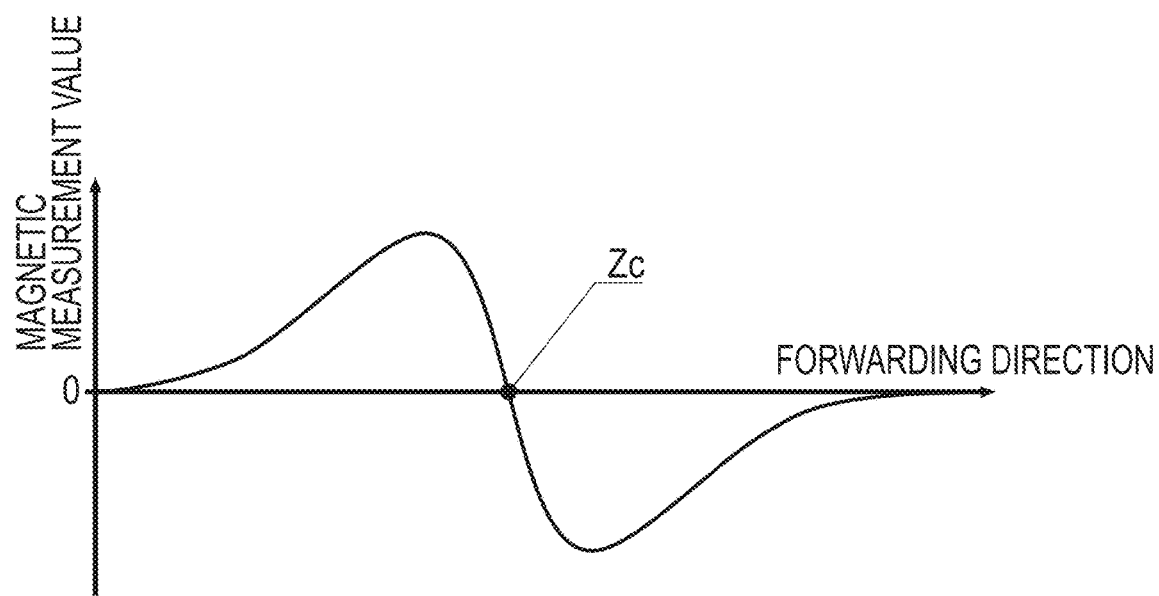
FIG. 15 is a descriptive diagram exemplarily depicting changes of a magnetic measurement value in a forwarding direction at the time of passing over a magnetic marker in the second embodiment.

On exemplarily-depicted road 100, as in FIG. 13, magnetic markers 10 are laid, for example, every 10 meters. When a vehicle travels this road 100, as with the first embodiment, the magnetic measurement process (S101) is performed by sensor array 2, and the motion estimation process (S103), the magnetic distribution generation process (S105), and the position estimation process (S109) are performed by control unit 32 (FIG. 14). A main difference from the first embodiment is that sensor array 2 performs a marker detection process (S102) in addition to the magnetic measurement process (S101). Sensor array 2 performs the marker detection process at a frequency of 3 kHz by using magnetic sensors Cn.

As described in the first embodiment, magnetic sensors Cn are configured to measure magnetic components in the forwarding direction and the vehicle-width direction of the vehicle. For example, when these magnetic sensors Cn move in the forwarding direction to pass directly above magnetic marker 10, the magnetic measurement value in the forwarding direction has its sign reversed before and after passing magnetic marker 10 as in FIG. 15, and changes so as to cross zero at a position directly above magnetic marker 10. Therefore, during traveling of vehicle, when zero-cross Zc occurs in which the sign of magnetism in the forwarding direction detected by any magnetic sensor Cn is reversed, it can be determined that sensor array 2 is positioned directly above magnetic marker 10. In this manner, when sensor array 2 is positioned directly above magnetic marker 10 and zero-cross Zc of the magnetic measurement value in the forwarding direction occurs, detection processing circuit 212 determines that magnetic marker 10 is detected.

Figure 16:
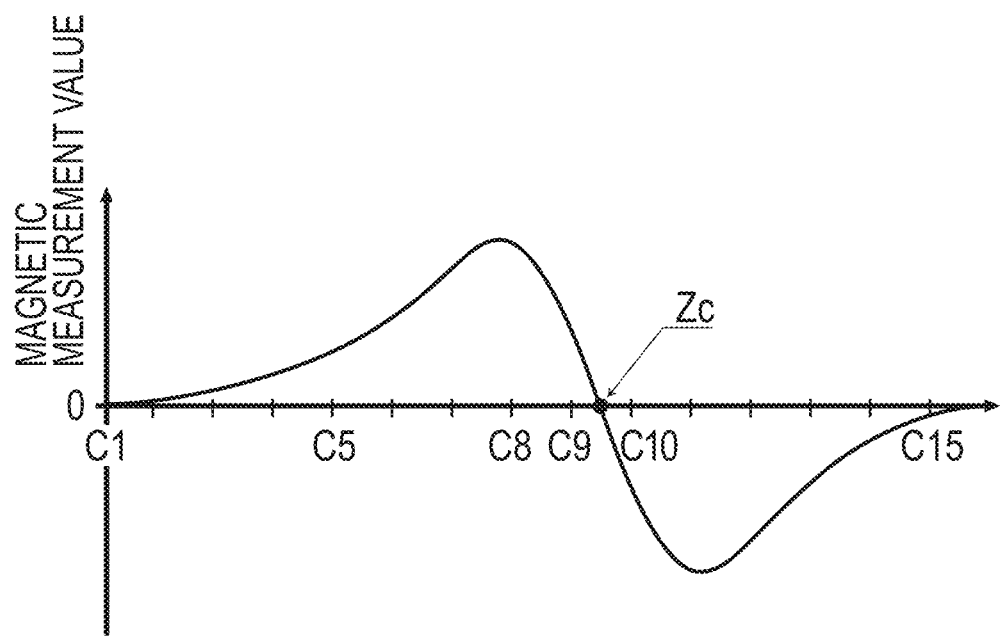
FIG. 16 is a descriptive diagram exemplarily depicting a distribution of magnetic measurement values in a vehicle-width direction from magnetic sensors Cn arrayed in the vehicle-width direction in the second embodiment.

Also, for example, as for a magnetic sensor with the same specification as that of magnetic sensors Cn, a movement along a virtual line in the vehicle-width direction passing directly above magnetic marker 10 is assumed. The magnetic measurement value in the vehicle-width direction has its sign reversed on both sides across magnetic marker 10 and changes so as to cross zero at a position directly above magnetic marker 10. In the case of sensor array 2 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10 (FIG. 16).

Based on a distribution curve of FIG. 16 exemplarily depicting magnetic measurement values in the vehicle-width direction of each magnetic sensor Cn of sensor array 2, an intermediate position between adjacent two magnetic sensors Cn across zero-cross Zc where the magnetism in the vehicle-width direction is reversed between positive and negative, or a position straight below any of magnetic sensor Cn of which the detected magnetic measurement value in the vehicle-width direction is zero and the magnetic measurement values in the vehicle-width direction of magnetic sensors Cn on both outer sides is reversed between positive and negative is the position of the magnetic marker 10 in the vehicle-width direction. This position in the vehicle-width direction indicates a relative position of vehicle 5 with respect to magnetic marker 10.

When detecting magnetic marker 10 as described above, sensor array 2 inputs marker detection information including information about the fact of that detection, a position in the vehicle-width direction, and so forth to control unit (reference sign 32 in FIG. 3). The position in the vehicle-width direction is indicated as a position in a one-dimensional direction in a one-dimensional magnetic distribution acquired by the magnetic measurement process. To this marker detection information, sensor array 2 links identification information of a one-dimensional magnetic distribution when magnetic marker 10 is detected.

Figure 17:
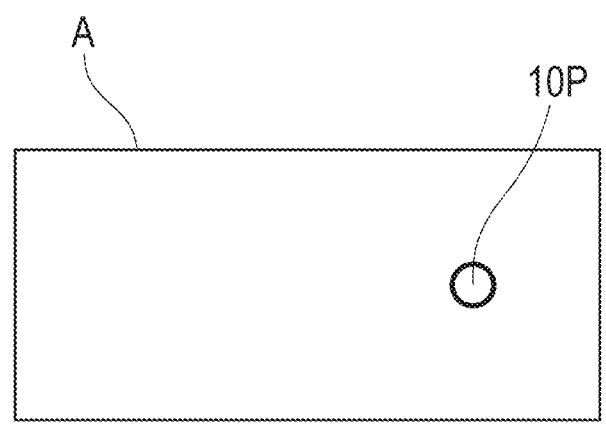
FIG. 17 is a diagram exemplarily depicting a measured magnetic distribution where the position of a magnetic marker is plotted in the second embodiment.
Figure 18:
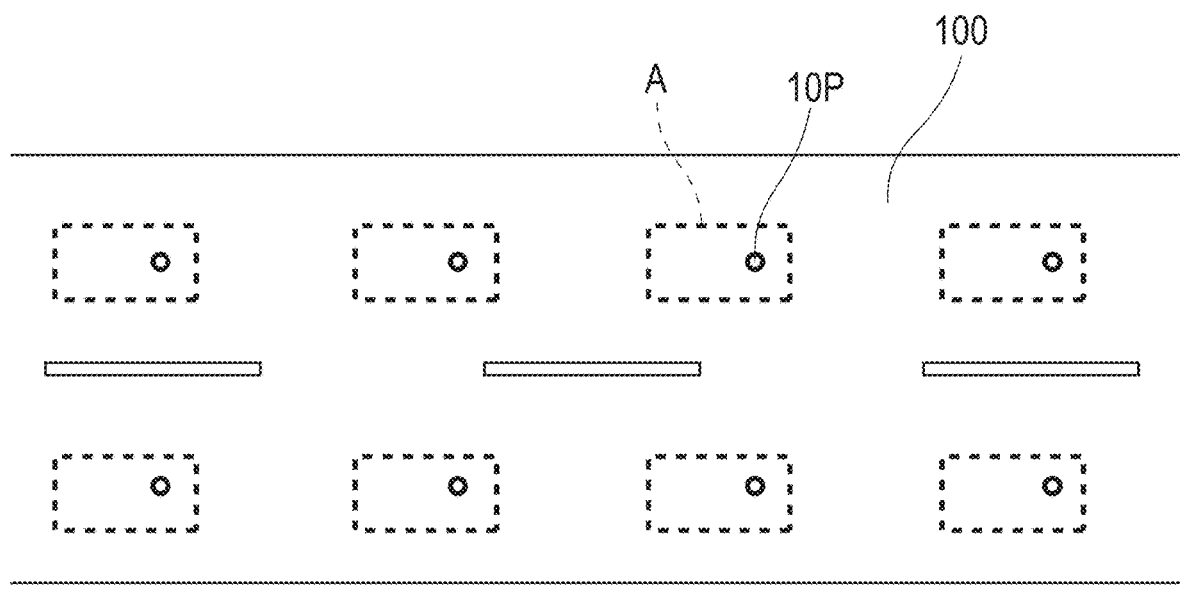
FIG. 18 is a descriptive diagram of a process of collating with the measured magnetic distribution in the second embodiment.

The control unit which performs the magnetic distribution generation process (S105) plots the position of magnetic marker 10 in measured magnetic distribution A as marker arrangement point 10P (FIG. 17). In measured magnetic distribution A acquired by two-dimensionally accumulating one-dimensional magnetic distributions along the traveling path of the vehicle, on which one-dimensional magnetic distribution, marker arrangement point 10P is present can be specified by identification information of the one-dimensional magnetic distribution linked to the marker detection information. Also, the position of marker arrangement point 10P in the vehicle-width direction in measured magnetic distribution A can be specified by the position in the vehicle-width direction included in the marker detection information.

Here, in road-surface magnetic distribution M2 as a target for collation with measured magnetic distribution A in the present embodiment, as with measured magnetic distribution A described above, the positions of magnetic markers 10 are plotted as marker arrangement points 10P. This road-surface magnetic distribution M2 can be acquired by a measuring vehicle which has the functions of the measuring vehicle exemplarily described in the first embodiment and also can perform the above-described marker detection process. In converted magnetic distribution M2D, which is a magnetic distribution acquired by converting road-surface magnetic distribution M2, marker arrangement points 10P are plotted at the same positions of the marker arrangement points in road-surface magnetic distribution M2.

The control unit which performs the position estimation process (S109) collates measured magnetic distribution A exemplarily depicted in FIG. 17 with converted magnetic distribution M2D having marker arrangement points 10P plotted thereon. As in FIG. 17, measured magnetic distribution A includes a plot of marker arrangement point 10P indicating the position of magnetic marker 10. To collate measured magnetic distribution A with converted magnetic distribution M2D, as in FIG. 18, a cross-correlation coefficient is preferably calculated at each position for every 10 meters where marker arrangement points 10P coincide. In this manner, in the case of a combination of converted magnetic distribution M2D and measured magnetic distribution A having a plot of marker arrangement points 10P, it is only required that a correlation operation be performed only at the position where marker arrangement points P coincide with each other. That is, it is only required that the position of measured magnetic distribution A be shifted at 10-meter pitches with respect to converted magnetic distribution M2D, and the amount of operation for correlation operation can be significantly suppressed.

That is, in this case, it is preferably specify an area corresponding to measured magnetic distribution A from among areas, where marker arrangement points 10P (the position of magnetic marker 10) coincide, in road-surface magnetic distribution M2 or converted magnetic distribution M2D. By limiting to an area where marker arrangement points 10P coincide, the number of times of collation with measured magnetic distribution A can be significantly reduced, and an area corresponding to measured magnetic distribution A can be efficiently specified. Marker arrangement points 10P can be utilized as magnetic singular points in the magnetic distributions. Note that the other configurations and the operation and effects are similar to those in the first embodiment.

Third Embodiment

The present embodiment is an example based on the position estimation system of the first embodiment, and is an example of application to a road where magnetic markers 10 are laid in a state in which the absolute positions can be specified. Details of this are described with reference to FIG. 19 to FIG. 21.

Figure 19:
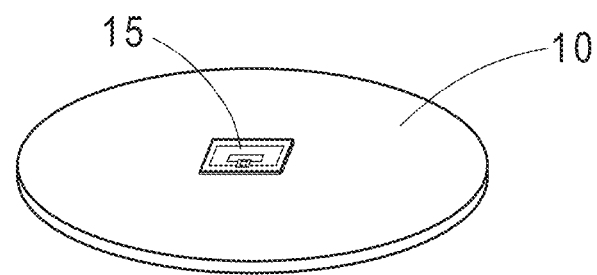
FIG. 19 is a perspective view depicting a magnetic marker to which an RF-ID tag is attached in a third embodiment.
Figure 20:
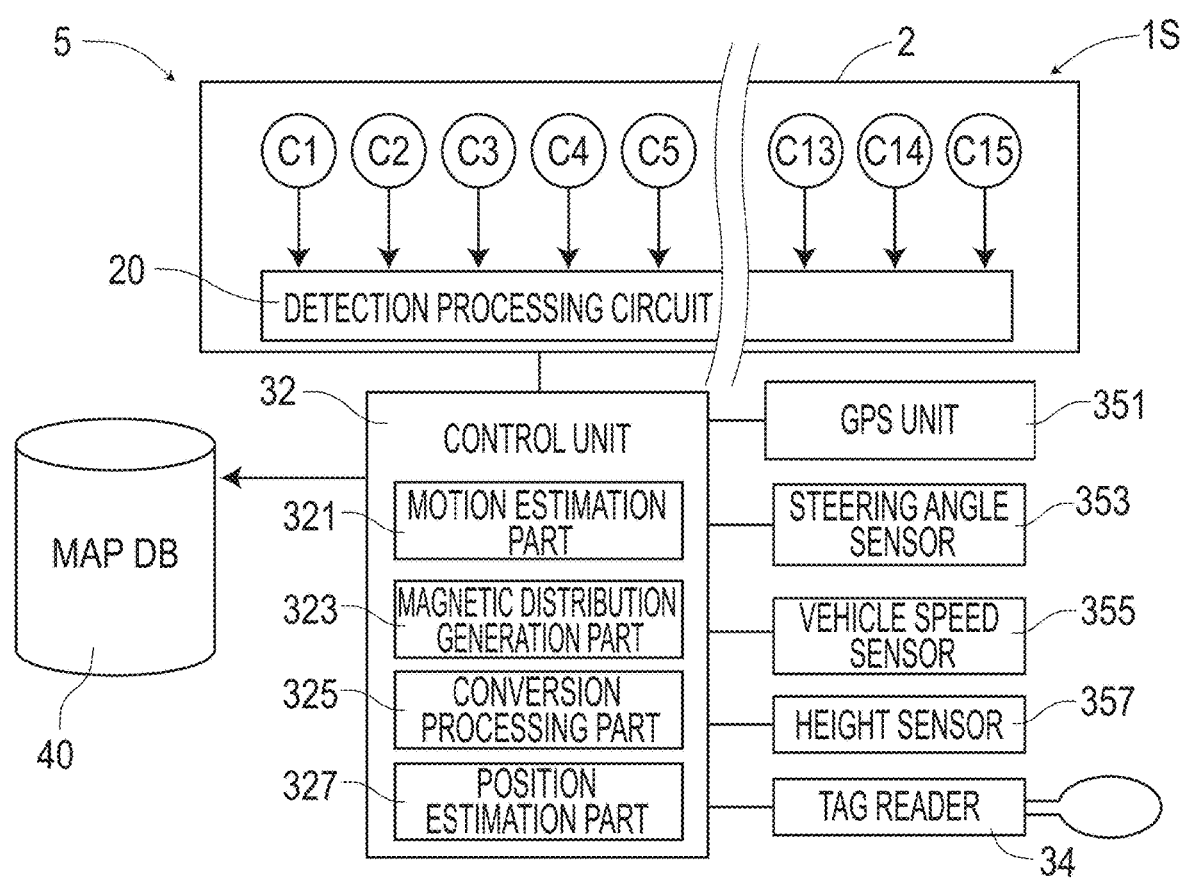
FIG. 20 is a block diagram depicting the configuration a vehicle has in the third embodiment.

In the present embodiment, magnetic marker 10 having RF-ID tag 15 affixed to a surface is laid on the road surface (FIG. 19). Vehicle 5 is provided with, in addition to the configuration of the first embodiment, tag reader 34 which can communicate with RF-ID tag 15 (FIG. 20). RF-ID tag 15 transmits position information indicating an absolute position of corresponding magnetic marker 10.

Detection processing circuit 20 of sensor array 2 can perform the marker detection process exemplarily depicted in the second embodiment. As described above, according to the marker detection process, it is possible to detect magnetic marker 10 and also measure the position of vehicle 5 relative to magnetic marker 10 in the vehicle-width direction.

When magnetic marker 10 is detected, control unit 32 receives position information from RF-ID tag 15 annexed to detected magnetic marker 10, thereby acquiring an absolute position of that magnetic marker 10. Then, a position shifted from the absolute position of magnetic marker 10 by the position of magnetic marker 10 in the vehicle-width direction measured by the marker detection process is specified as an own vehicle position (center position of sensor array 2).

Figure 21:
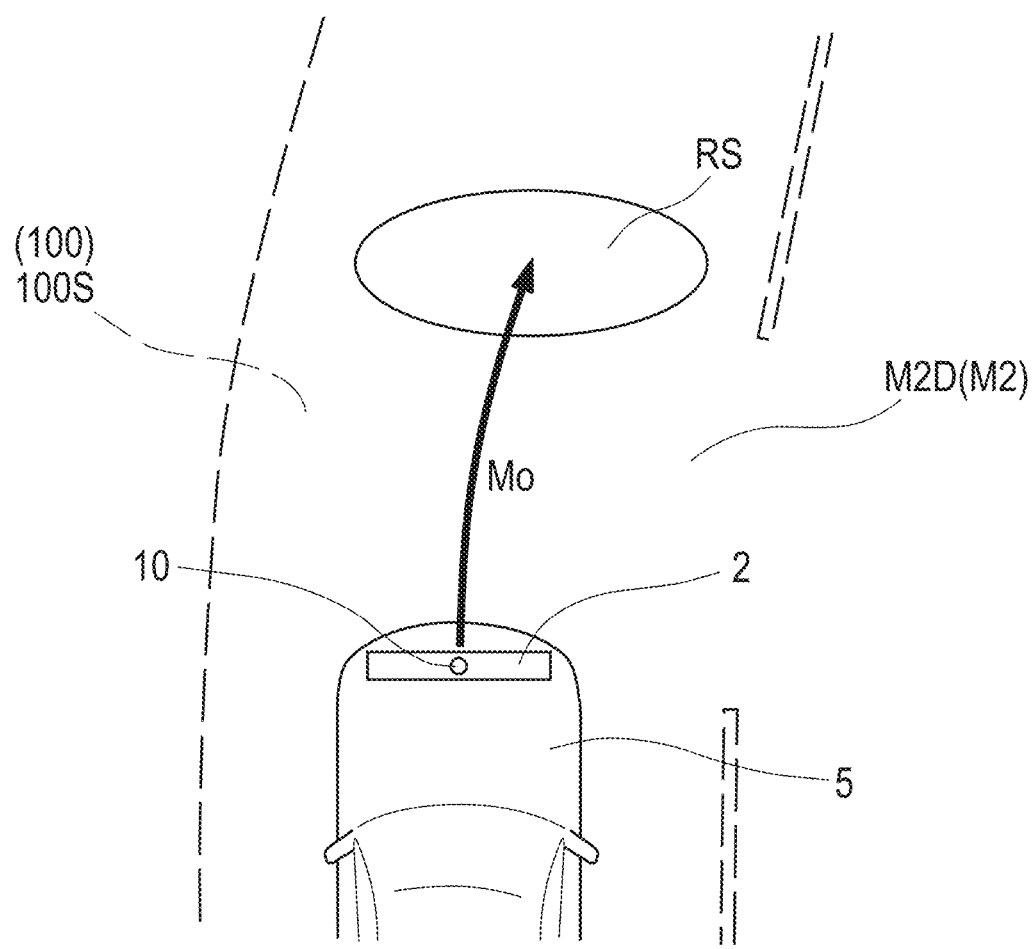
FIG. 21 is a descriptive diagram depicting a range to which an arrival position of the vehicle after passing over a magnetic marker belongs in the third embodiment.

On the other hand, when no magnetic marker 10 is detected, as with the configuration described in the first embodiment, control unit 32 specifies an area corresponding to the measured magnetic distribution to estimate an own vehicle position with reference to a map including road-surface magnetic distribution M2. Here, according to the steering angle measured by steering angle sensor 353 and the vehicle speed measured by vehicle speed sensor 355, as with the first embodiment, motion Mo of vehicle 5 can be estimated (FIG. 21). By estimating motion Mo of vehicle 5, an arrival position of vehicle 5 in accordance with the elapsed time after passing over magnetic marker 10 can be estimated. When a range RS on a map to which this arrival position belongs is selected and collation with the measured magnetic distribution is performed with limitation to this range RS, an area corresponding to measured magnetic distribution A in road-surface magnetic distribution M2 or converted magnetic distribution M2D can be efficiently specified. Note that the other configurations and the operation and effects are similar to those in the first embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1S position estimation system
1 map
10 magnetic marker
2 sensor array
32 control unit
321 motion estimation part
323 magnetic distribution generation part
325 conversion processing part
327 position estimation part
351 GPS unit
353 steering angle sensor
355 vehicle speed sensor
357 height sensor
40 map database (storage part)
5 vehicle
A measured magnetic distribution
Cn magnetic sensor
M1 structure map
M2 road-surface magnetic distribution
M2D converted magnetic distribution

The invention claimed is:

1. A position estimation method for a vehicle including a magnetic sensor which measures magnetism acting from a road surface forming a surface of a traveling road to estimate an own vehicle position, comprising:
a magnetic measurement process of acquiring magnetic measurement values from the magnetic sensor;
a magnetic distribution generation process of generating a measured magnetic distribution indicating a distribution of magnetic data based on the magnetic measurement values acquired from the magnetic measurement process; and
a position estimation process of, by referring to a map associated with a road-surface magnetic distribution indicating a distribution of magnetic data based on quantities of magnetism at respective points on the road surface, specifying an area of the road-surface magnetic distribution corresponding to the measured magnetic distribution and estimating the own vehicle position based on a position of the area corresponding to the measured magnetic distribution on the map.

2. The position estimation method in claim 1, wherein the magnetic data based on the magnetic measurement values and the magnetic data based on the quantities of magnetism at the respective points on the road surface are magnetic gradients, and each of the measured magnetic distribution and the road-surface magnetic distribution is a distribution of the magnetic gradients.

3. The position estimation method in claim 2, comprising a conversion process of converting the road-surface magnetic distribution into a distribution at an attachment height of the magnetic sensor, wherein
in the position estimation process, the distribution after conversion by the conversion process and the measured magnetic distribution are collated to specify an area corresponding to the measured magnetic distribution.

4. The position estimation method in claim 2, comprising a conversion process of converting the measured magnetic distribution into a distribution at a height of the road surface, wherein
in the position estimation process, the distribution after conversion by the conversion and the road-surface magnetic distribution are collated to specify the area corresponding to the measured magnetic distribution.

5. The position estimation method in claim 1, comprising a conversion process of converting the road-surface magnetic distribution into a distribution at an attachment height of the magnetic sensor, wherein
in the position estimation process, the distribution after conversion by the conversion process and the measured magnetic distribution are collated to specify an area corresponding to the measured magnetic distribution.

6. The position estimation method in claim 5, wherein the conversion process is a process of converting the distribution in accordance with a ratio of magnetic measurement values from two magnetic sensors with different attachment heights.

7. The position estimation method in claim 6, wherein the conversion process is a process of converting the distribution in accordance with a magnitude of the magnetic measurement value acquired by the magnetic sensor for a magnetic marker which is a magnetism generation source laid on the road surface and having known magnetic intensity.

8. The position estimation method in claim 5, wherein the conversion process is a process of converting the distribution in accordance with a magnitude of the magnetic measurement value acquired by the magnetic sensor for a magnetic marker which is a magnetism generation source laid on the road surface and having known magnetic intensity.

9. The position estimation method in claim 1, comprising a conversion process of converting the measured magnetic distribution into a distribution at a height of the road surface, wherein
in the position estimation process, the distribution after conversion by the conversion and the road-surface magnetic distribution are collated to specify the area corresponding to the measured magnetic distribution.

10. The position estimation method in claim 9, wherein the conversion process is a process of converting the distribution in accordance with a ratio of magnetic measurement values from two magnetic sensors with different attachment heights.

11. The position estimation method in claim 10, wherein the conversion process is a process of converting the distribution in accordance with a magnitude of the magnetic measurement value acquired by the magnetic sensor for a magnetic marker which is a magnetism generation source laid on the road surface and having known magnetic intensity.

12. The position estimation method in claim 9, wherein the conversion process is a process of converting the distribution in accordance with a magnitude of the magnetic measurement value acquired by the magnetic sensor for a magnetic marker which is a magnetism generation source laid on the road surface and having known magnetic intensity.

13. The position estimation method in claim 1, wherein magnetic markers as magnetism generation sources are laid on the traveling road as spaced in a state in which absolute positions can be specified,
    in the position estimation process, when any of the magnetic markers is detected by the vehicle, the own vehicle position is estimated with reference to the absolute position of the magnetic marker, and
    when none of the magnetic markers is detected, the own vehicle position is estimated based on the position of the area corresponding to the measured magnetic distribution on the map.

14. The position estimation method in claim 13, wherein when none of the magnetic markers is detected, an arrival position of the vehicle after detecting any magnetic marker is estimated, a range to which the arrival position belongs on the map is selected, and the area corresponding to the measured magnetic distribution is specified in the range on the map.

15. The position estimation method in claim 13, wherein the positions of the magnetic markers laid on the road surface are specified in the road-surface magnetic distribution and the measured magnetic distribution, and
    in the position estimation process, the area corresponding to the measured magnetic distribution is specified among areas where the position of the magnetic marker coincides in the road-surface magnetic distribution.

16. A position estimation system for a vehicle including a magnetic sensor which measures magnetism acting from a road surface forming a surface of a traveling road to estimate an own vehicle position, comprising:
    a storage part which stores a map associated with a road-surface magnetic distribution, which is a distribution of magnetic data based on quantities of magnetism at respective points on the road surface;
    a magnetic distribution generation part which acquires magnetic measurement values from the magnetic sensor and generates a measured magnetic distribution, which is a distribution of magnetic data based on the magnetic measurement values; and
    a position estimation part which specifies an area corresponding to the measured magnetic distribution in the road-surface magnetic distribution associated with the map stored in the storage part and estimates the own vehicle position based on a position of the area corresponding to the measured magnetic distribution on the map.

17. The position estimation system in claim 16, wherein the road surface is a surface of a pavement made of a pavement material having magnetic powder, which is powder of a magnetic material, dispersed therein and the magnetic powder dispersed in the pavement is magnetized so that a magnetic distribution of the road surface forms a predetermined pattern.

18. The position estimation system in claim 16, wherein magnetic markers are laid along the traveling road.

19. The position estimation system in claim 18, wherein the positions of the magnetic markers are specified in the road-surface magnetic distribution and the measured magnetic distribution, and
    the position estimation part is configured to specify the area corresponding to the measured magnetic distribution among areas of where the position of the magnetic marker coincides in the road-surface magnetic distribution.

20. The position estimation system in claim 16, wherein the magnetic data based on the magnetic measurement values and the magnetic data based on the quantities of magnetism at the respective points on the road surface are magnetic gradients, and each of the measured magnetic distribution and the road-surface magnetic distribution is a distribution of the magnetic gradients.

\* \* \* \* \*